US011330664B1

(12) United States Patent
Martin et al.

(10) Patent No.: US 11,330,664 B1
(45) Date of Patent: *May 10, 2022

(54) APPARATUS AND METHOD FOR OBTAINING EMERGENCY DATA AND PROVIDING A MAP VIEW

(71) Applicant: RapidSOS, Inc., New York, NY (US)

(72) Inventors: Michael John Martin, Long Island, NY (US); Nicholas Edward Horelik, Long Island City, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,626

(22) Filed: May 21, 2021

Related U.S. Application Data

(60) Provisional application No. 63/148,581, filed on Feb. 11, 2021, provisional application No. 63/133,045, filed on Dec. 31, 2020.

(51) Int. Cl.
  *H04W 76/50* (2018.01)
  *H04W 4/90* (2018.01)
  (Continued)

(52) U.S. Cl.
  CPC ......... *H04W 76/50* (2018.02); *H04L 65/1006* (2013.01); *H04W 4/021* (2013.01); *H04W 4/025* (2013.01); *H04W 4/90* (2018.02)

(58) Field of Classification Search
  CPC ......... H04W 4/90; H04W 76/90; H04W 4/02; H04W 4/021; H04W 4/029; H04W 76/15;
  (Continued)

(56) References Cited

U.S. PATENT DOCUMENTS

| 5,379,337 A | 1/1995 | Castillo et al. |
| 5,479,482 A | 12/1995 | Grimes |

(Continued)

FOREIGN PATENT DOCUMENTS

| CA | 2662606 A1 | 10/2009 |
| CA | 2697986 A1 | 9/2010 |

(Continued)

OTHER PUBLICATIONS

Tazaki. Floating Ground: An Architecture for Network Mobility and Ad Hoc Network Convergence. Thesis. Graduate School of Media and Governance Keio University 5322 Endo Fujisaw.

(Continued)

*Primary Examiner* — Jean A Gelin
(74) *Attorney, Agent, or Firm* — Cygan Law Offices P.C.; Joseph T. Cygan

(57) ABSTRACT

A disclosed method includes receiving emergency data related to emergency calls emanating from mobile devices, independently from emergency call routing to an emergency network; determining an emergency network that should receive the emergency data; providing the emergency data to the emergency network; and providing a map view to the emergency network entity of the emergency network using the emergency data and displaying location indicators corresponding to locations of mobile devices identified by the emergency data. Another disclosed method includes receiving emergency data related to emergency calls emanating from mobile devices, independently from emergency call routing to an emergency network; detecting emergency call data received at the emergency network; and providing a map view to an emergency network entity of the emergency network using the emergency data, where the map view displays location indicators corresponding to locations of (Continued)

mobile devices identified by the emergency call data received at the emergency network.

28 Claims, 21 Drawing Sheets

(51) Int. Cl.
*H04L 65/10* (2022.01)
*H04W 4/021* (2018.01)
*H04W 4/02* (2018.01)

(58) Field of Classification Search
CPC ..... H04W 76/50; H04W 4/025; H04W 64/00; H04W 80/06; G06F 16/29; G06F 21/6245; G06F 2221/2111; H04M 3/5116
See application file for complete search history.

(56) References Cited

U.S. PATENT DOCUMENTS

| | | |
|---|---|---|
| 5,563,931 A | 10/1996 | Bishop et al. |
| 5,596,625 A | 1/1997 | Leblanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lighter et al. |
| 6,262,655 B1 | 7/2001 | Yoshioka et al. |
| 6,292,687 B1 | 9/2001 | Lowell et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | Mcsheffrey et al. |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III et al. |
| 7,519,372 B2 | 4/2009 | Macdonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,494,868 B2 | 7/2013 | Saalsaa |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,761,721 B2 | 6/2014 | Li |
| 8,792,867 B1 | 7/2014 | Negahban et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 | 4/2015 | Hodgson et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |

(56) References Cited

U.S. PATENT DOCUMENTS

| | | | |
|---|---|---|---|
| 9,408,051 B2 | 8/2016 | Finney et al. | |
| 9,420,099 B1 | 8/2016 | Krishnan et al. | |
| 9,426,638 B1 | 8/2016 | Johnson | |
| 9,497,585 B1 | 11/2016 | Cooley et al. | |
| 9,503,876 B2 | 11/2016 | Saito et al. | |
| 9,544,260 B2 | 1/2017 | Cuff et al. | |
| 9,544,750 B1 | 1/2017 | Self et al. | |
| 9,591,467 B2 | 3/2017 | Piett et al. | |
| 9,609,128 B2 | 3/2017 | Dahan et al. | |
| 9,629,185 B1 | 4/2017 | Gluckman et al. | |
| 9,635,534 B2 | 4/2017 | Maier et al. | |
| 9,648,479 B2 | 5/2017 | Michaelis et al. | |
| 9,659,484 B1 | 5/2017 | Mehta et al. | |
| 9,693,213 B2 | 6/2017 | Self et al. | |
| 9,734,721 B2 | 8/2017 | Stenneth et al. | |
| 9,736,670 B2 | 8/2017 | Mehta et al. | |
| 9,756,169 B2 | 9/2017 | Mehta et al. | |
| 9,805,430 B2 | 10/2017 | Miasnik et al. | |
| 9,838,858 B2 | 12/2017 | Anand et al. | |
| 9,877,177 B2 | 1/2018 | Lesage et al. | |
| 9,924,043 B2 | 3/2018 | Mehta et al. | |
| 9,936,365 B1* | 4/2018 | Elam | H04M 3/5116 |
| 9,942,739 B2 | 4/2018 | Bozik et al. | |
| 9,986,404 B2 | 5/2018 | Mehta et al. | |
| 9,992,655 B2 | 6/2018 | Anand et al. | |
| 9,998,507 B2 | 6/2018 | Mehta et al. | |
| 10,002,375 B1 | 6/2018 | Scythes et al. | |
| 10,089,854 B2 | 10/2018 | Hender et al. | |
| 10,136,294 B2 | 11/2018 | Mehta et al. | |
| 10,140,482 B2 | 11/2018 | Mehta et al. | |
| 10,140,842 B2 | 11/2018 | Mehta et al. | |
| 10,142,213 B1 | 11/2018 | Hart et al. | |
| 10,142,469 B2 | 11/2018 | Klaban | |
| 10,142,816 B2 | 11/2018 | Cavendish et al. | |
| 10,165,431 B2 | 12/2018 | Bozik et al. | |
| 10,375,558 B2 | 8/2019 | Katz et al. | |
| 10,419,915 B2 | 9/2019 | Mehta et al. | |
| 10,425,799 B2 | 9/2019 | Anand et al. | |
| 10,447,865 B2 | 10/2019 | Mehta et al. | |
| 10,657,799 B2 | 5/2020 | Mehta et al. | |
| 10,701,541 B2 | 6/2020 | Mehta et al. | |
| 10,701,542 B2 | 6/2020 | Martin et al. | |
| 10,708,412 B1 | 7/2020 | Killpack | |
| 10,771,951 B2 | 9/2020 | Mehta et al. | |
| 10,805,786 B2 | 10/2020 | Pellegrini et al. | |
| 10,820,181 B2 | 10/2020 | Horelik et al. | |
| 10,861,320 B2 | 12/2020 | Martin et al. | |
| 10,911,926 B2 | 2/2021 | Pellegrini et al. | |
| 10,922,776 B2 | 2/2021 | Kumar et al. | |
| 10,977,927 B2 | 4/2021 | Katz et al. | |
| 2001/0051849 A1 | 12/2001 | Boone | |
| 2002/0001367 A1 | 1/2002 | Lee | |
| 2002/0027975 A1 | 3/2002 | Oxley | |
| 2002/0057678 A1 | 5/2002 | Jiang et al. | |
| 2002/0120698 A1 | 8/2002 | Tamargo | |
| 2003/0069035 A1 | 4/2003 | Shurvinton | |
| 2003/0109245 A1 | 6/2003 | McCalmont et al. | |
| 2003/0195775 A1 | 10/2003 | Hampton et al. | |
| 2004/0203569 A1* | 10/2004 | Jijina | H04W 76/50 455/404.1 |
| 2004/0203572 A1 | 10/2004 | Aerrabotu et al. | |
| 2004/0229620 A1 | 11/2004 | Zhao et al. | |
| 2004/0266390 A1 | 12/2004 | Faucher et al. | |
| 2005/0085215 A1 | 4/2005 | Kokko et al. | |
| 2005/0104745 A1 | 5/2005 | Bachelder et al. | |
| 2005/0111630 A1 | 5/2005 | Potorny et al. | |
| 2005/0151642 A1 | 7/2005 | Tupler et al. | |
| 2005/0190892 A1 | 9/2005 | Dawson et al. | |
| 2005/0192746 A1 | 9/2005 | King et al. | |
| 2005/0220277 A1 | 10/2005 | Blalock et al. | |
| 2005/0222829 A1 | 10/2005 | Dumas | |
| 2005/0239477 A1 | 10/2005 | Kim et al. | |
| 2005/0242944 A1 | 11/2005 | Bankert et al. | |
| 2005/0282518 A1 | 12/2005 | D'Evelyn et al. | |
| 2005/0285181 A1 | 12/2005 | Yasui et al. | |
| 2006/0085275 A1 | 4/2006 | Stokes et al. | |
| 2006/0109960 A1 | 5/2006 | D'Evelyn et al. | |
| 2006/0154642 A1 | 7/2006 | Scannell, Jr. | |
| 2006/0217105 A1 | 9/2006 | Kumar P S et al. | |
| 2006/0265195 A1* | 11/2006 | Woodard | G08B 25/08 702/188 |
| 2006/0293024 A1 | 12/2006 | Benco et al. | |
| 2007/0003024 A1 | 1/2007 | Olivier et al. | |
| 2007/0030144 A1 | 2/2007 | Titus et al. | |
| 2007/0030146 A1 | 2/2007 | Shepherd | |
| 2007/0033095 A1 | 2/2007 | Hodgin et al. | |
| 2007/0049287 A1 | 3/2007 | Dunn | |
| 2007/0053308 A1 | 3/2007 | Dumas et al. | |
| 2007/0058528 A1 | 3/2007 | Massa et al. | |
| 2007/0060097 A1 | 3/2007 | Edge et al. | |
| 2007/0161383 A1 | 7/2007 | Caci | |
| 2007/0164872 A1 | 7/2007 | Monroe | |
| 2007/0171854 A1 | 7/2007 | Chen et al. | |
| 2007/0218895 A1 | 9/2007 | Saito et al. | |
| 2007/0232328 A1* | 10/2007 | Kramarz-Von Kohout | H04W 4/90 455/456.2 |
| 2008/0019268 A1 | 1/2008 | Rollins | |
| 2008/0063153 A1 | 3/2008 | Krivorot et al. | |
| 2008/0077474 A1 | 3/2008 | Dumas et al. | |
| 2008/0081646 A1 | 4/2008 | Morin et al. | |
| 2008/0166990 A1 | 7/2008 | Toiv | |
| 2008/0194238 A1 | 8/2008 | Kwon | |
| 2008/0253535 A1 | 10/2008 | Sherry et al. | |
| 2008/0274721 A1 | 11/2008 | Stagnetto | |
| 2008/0294058 A1 | 11/2008 | Shklarski | |
| 2008/0309486 A1 | 12/2008 | McKenna et al. | |
| 2009/0041206 A1 | 2/2009 | Hobby et al. | |
| 2009/0134982 A1 | 5/2009 | Robertson et al. | |
| 2009/0186596 A1* | 7/2009 | Kaltsukis | H04M 3/5116 455/404.2 |
| 2009/0214000 A1 | 8/2009 | Patel et al. | |
| 2009/0257345 A1 | 10/2009 | King | |
| 2009/0311987 A1 | 12/2009 | Edge et al. | |
| 2009/0322513 A1 | 12/2009 | Hwang et al. | |
| 2010/0002846 A1 | 1/2010 | Ray et al. | |
| 2010/0003946 A1* | 1/2010 | Ray | H04M 3/5116 455/404.1 |
| 2010/0003964 A1 | 1/2010 | Khare et al. | |
| 2010/0093305 A1 | 4/2010 | Reich et al. | |
| 2010/0156626 A1 | 6/2010 | Story | |
| 2010/0159871 A1 | 6/2010 | Tester | |
| 2010/0159976 A1 | 6/2010 | Marocchi et al. | |
| 2010/0161727 A1 | 6/2010 | Shaffer et al. | |
| 2010/0166153 A1 | 7/2010 | Guleria et al. | |
| 2010/0190468 A1 | 7/2010 | Scott et al. | |
| 2010/0202368 A1 | 8/2010 | Hans | |
| 2010/0238018 A1 | 9/2010 | Kelly | |
| 2010/0261448 A1 | 10/2010 | Peters | |
| 2010/0262668 A1 | 10/2010 | Piett et al. | |
| 2010/0317317 A1 | 12/2010 | Maier et al. | |
| 2011/0009086 A1 | 1/2011 | Poremba et al. | |
| 2011/0029600 A1 | 2/2011 | Theimer | |
| 2011/0071880 A1 | 3/2011 | Spector | |
| 2011/0086607 A1 | 4/2011 | Wang et al. | |
| 2011/0103266 A1 | 5/2011 | Andreasen et al. | |
| 2011/0134897 A1 | 6/2011 | Montemurro et al. | |
| 2011/0151829 A1 | 6/2011 | Velusamy et al. | |
| 2011/0153368 A1 | 6/2011 | Pierre et al. | |
| 2011/0201357 A1 | 8/2011 | Garrett et al. | |
| 2011/0263219 A1 | 10/2011 | Hasenfang et al. | |
| 2011/0263319 A1 | 10/2011 | Hamalainen et al. | |
| 2012/0002792 A1 | 1/2012 | Chang | |
| 2012/0028599 A1 | 2/2012 | Hatton et al. | |
| 2012/0029970 A1 | 2/2012 | Stiles et al. | |
| 2012/0040636 A1 | 2/2012 | Kazmi | |
| 2012/0066139 A1 | 3/2012 | Guzman et al. | |
| 2012/0092161 A1 | 4/2012 | West | |
| 2012/0144019 A1 | 6/2012 | Zhu | |
| 2012/0157795 A1 | 6/2012 | Chiu et al. | |
| 2012/0202428 A1 | 8/2012 | Mirbaha et al. | |
| 2012/0210325 A1 | 8/2012 | De Lind Van Wijngaarden et al. | |
| 2012/0218102 A1 | 8/2012 | Bivens et al. | |
| 2012/0256745 A1 | 10/2012 | Piett et al. | |

(56) References Cited

U.S. PATENT DOCUMENTS

| | | |
|---|---|---|
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0012155 A1 | 1/2013 | Forstall et al. |
| 2013/0030825 A1 | 1/2013 | Bagwandeen et al. |
| 2013/0052983 A1 | 2/2013 | Fletcher et al. |
| 2013/0065569 A1 | 3/2013 | Leipzig et al. |
| 2013/0082837 A1 | 4/2013 | Cosentino et al. |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0260710 A1 | 10/2013 | Hr |
| 2013/0309994 A1 | 11/2013 | Hellwig et al. |
| 2013/0331055 A1 | 12/2013 | Mckown et al. |
| 2013/0331058 A1 | 12/2013 | Harvey |
| 2014/031000 A1 | 1/2014 | Hanover |
| 2014/0045450 A1 | 2/2014 | Ballantyne et al. |
| 2014/0051379 A1 | 2/2014 | Ganesh et al. |
| 2014/0057590 A1* | 2/2014 | Romero ............... H04W 4/02 455/404.2 |
| 2014/0086108 A1 | 3/2014 | Dunn et al. |
| 2014/0087680 A1 | 3/2014 | Luukkala et al. |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0222462 A1 | 8/2014 | Shakil et al. |
| 2014/0248848 A1 | 9/2014 | Mufti et al. |
| 2014/0253326 A1 | 9/2014 | Cho et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0055453 A1 | 2/2015 | Chaki et al. |
| 2015/0055554 A1 | 2/2015 | Sedlacek et al. |
| 2015/0065082 A1 | 3/2015 | Sehgal |
| 2015/0081209 A1 | 3/2015 | Yeh et al. |
| 2015/0081927 A1 | 3/2015 | Xu et al. |
| 2015/0085997 A1* | 3/2015 | Biage ............... H04W 4/02 379/45 |
| 2015/0087259 A1 | 3/2015 | Hinsen |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South |
| 2015/0112883 A1 | 4/2015 | Orduna et al. |
| 2015/0137972 A1 | 5/2015 | Nepo et al. |
| 2015/0140936 A1 | 5/2015 | Sachs et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0316493 A1 | 10/2016 | Davis et al. |
| 2016/0330769 A1 | 11/2016 | Edge |
| 2016/0337831 A1* | 11/2016 | Piett .................. H04W 4/90 |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0078226 A1 | 3/2017 | Daly et al. |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1 | 11/2017 | Mehta et al. |
| 2017/0331954 A1 | 11/2017 | Kotnis et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0039737 A1 | 2/2018 | Dempers et al. |
| 2018/0077282 A1 | 3/2018 | Herron et al. |
| 2018/0077553 A1 | 3/2018 | Gideon, III |
| 2018/0150928 A1 | 5/2018 | Dejewski et al. |
| 2018/0176271 A1 | 6/2018 | Laurent |
| 2018/0262544 A1 | 9/2018 | Mehta et al. |
| 2018/0352408 A1 | 12/2018 | Baer et al. |
| 2019/0020993 A1 | 1/2019 | Nguyen |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0174288 A1 | 6/2019 | Bozik et al. |
| 2019/0281165 A1 | 9/2019 | Mehta et al. |
| 2019/0320310 A1 | 10/2019 | Horelik et al. |
| 2019/0327597 A1 | 10/2019 | Katz et al. |
| 2019/0335310 A1 | 10/2019 | Anand et al. |
| 2020/0059776 A1 | 2/2020 | Martin et al. |
| 2020/0100084 A1 | 3/2020 | Martin et al. |
| 2020/0126174 A1 | 4/2020 | Halse et al. |
| 2020/0221279 A1 | 7/2020 | Mehta et al. |

(56) References Cited

U.S. PATENT DOCUMENTS

| | | |
|---|---|---|
| 2020/0274962 A1 | 8/2020 | Martin et al. |
| 2020/0314240 A1 | 10/2020 | Leavitt et al. |
| 2021/0006961 A1 | 1/2021 | King-Berkman et al. |
| 2021/0014659 A1 | 1/2021 | Mehta et al. |
| 2021/0037368 A1 | 2/2021 | Leavitt et al. |
| 2021/0110686 A1 | 4/2021 | Slavin et al. |
| 2021/0120394 A1 | 4/2021 | Martin et al. |
| 2021/0127228 A1 | 4/2021 | Baarman et al. |
| 2021/0204108 A1 | 7/2021 | Horelik et al. |
| 2021/0239489 A1* | 8/2021 | Gotschall ........... G01C 21/3664 |
| 2021/0266722 A1 | 8/2021 | Pellegrini et al. |
| 2021/0289334 A1 | 9/2021 | Martin et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 106021508 A | 10/2016 |
| EP | 2161912 A2 | 3/2010 |
| JP | H10314133 A | 12/1998 |
| JP | H1170086 A | 3/1999 |
| JP | 2006319946 A | 11/2006 |
| JP | 2006334369 A | 12/2006 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO0022593 A1 | 4/2000 |
| WO | WO0165763 A2 | 9/2001 |
| WO | WO0167419 A2 | 9/2001 |
| WO | WO2007109599 | 9/2007 |
| WO | WO2012129561 A1 | 9/2012 |
| WO | WO2014025563 A1 | 2/2014 |
| WO | WO2014063121 A1 | 4/2014 |
| WO | WO2014074420 A1 | 5/2014 |
| WO | WO2014176646 A1 | 11/2014 |
| WO | WO2015127867 A1 | 9/2015 |
| WO | WO2015196155 A1 | 12/2015 |
| WO | WO2016044540 A1 | 3/2016 |
| WO | WO2017079354 A1 | 5/2017 |
| WO | WO2017083571 A1 | 5/2017 |
| WO | WO2017100220 A1 | 6/2017 |
| WO | WO2017106775 A1 | 6/2017 |
| WO | WO2017112820 A1 | 6/2017 |
| WO | WO2017189610 A2 | 11/2017 |
| WO | WO2017196753 A1 | 11/2017 |
| WO | WO2018039142 A1 | 3/2018 |
| WO | WO2019113129 A1 | 6/2019 |
| WO | WO2020172612 A1 | 8/2020 |
| WO | WO2020205033 A1 | 10/2020 |
| WO | WO2021034859 A1 | 2/2021 |

OTHER PUBLICATIONS

U.S. Census Bureau. Developers: Population Estimates APIs. Available at https://www.census.gov/data/developers/data-sets/popest-popproj/popest.html (2 pgs.) (Accessed Septembe.

Weather Company Data For IBM Bluemix APIs. Available at https://twcservice.mybluemix.net/rest-api/ (100 pgs) (Accessed Sep. 2017).

ArcGIS REST Services Directory. Folder: TIGERWeb. Available at https://tigerweb.geo.census.gov/arcgis/rest/services/TIGERweb. (1 pg.) (Accessed Sep. 2017).

Homeland Security Science and Technology. Using Social Media for Enhanced Situational Awareness and Decision Support. Virtual Social Medial Working Group and DHS First Respond.

Marcus et al. Twitinfo: Aggregating and Visualizing Microblogs for Event Exploration. ACM CHI Conference 2011 May 7-12, 2011, (10 pgs).

Meier. MatchApp: Next Generation Disaster Response App? iRevolution (12 pgs.) (Feb. 27, 2013).

National Emergency Number Association (Nena) Technical Committee Chairs: NENA Functional and Interface Standards for Next Generation 9-1-1 Version 1.0 (i3). (Dec. 18, 2017). Retr.

National Emergency Number Association (NENA). Social Networking in 9-1-1 PSAPs Information Document. Available at https://c.ymcdn.com/sites/www.nena.org/resource/resmgr/Standa.

Seattle Real Time Fire 911 Calls. Available at https://catalog.data.gov/dataset/seattle-real-time-fire-911-calls-6cdf3 (3 pgs.) (Accessed Sep. 2017).

Song. Next Generation Emergency Call System with Enhanced Indoor Positioning, Columbia University. Thesis [online] [retrieved Apr. 20, 2020 from https://scholar.google.co.kr/citat.

* cited by examiner

*1803*

| EMERGENCY CALL DATA DISPLAY | ? |
|---|---|
| (720) 555 5555 06:21 01/30 | |
| JOHN DOE | |
| DENVER, CO | |
| CELL CARRIER CO. | |
| www.630-533-2234-rapidsosportal.com  *1805* | |
| LAT: 39.7430 | |
| LON: -104.8946 | |
| METERS: 10.1  PERCENT: 95 | |

CALL CONTROLS

☒ Ready  ☒ Answer  ☒ Release  ☒ Redial  ☒ Drop

DEVICE DATA (RAPIDSOS)

| PHONE # | LAST LOCATION UPDATE | PROBABLE ADDRESS |
|---|---|---|
| 720-555-5555 | 06:26:21 | 111 S. HILL ST DENVER, CO 80202 |

LAT: 39.742991
LONG: -104.99534
CONF: 97
METERS: 10.1
Additional Info: www.630-533-2234-rapidsosportal.com  *1807*

| Device Location | Map | Sensor Data | SMS User |
|---|---|---|---|

CALL QUEUE
720-555-0054
303-322-7291
555-322-0054

| | | Phone Number<br>(318) 675-1234 | Last Location Update<br>21:45:04 | Probable Address<br>Likelihood: 80% | Latitude : 39.7439<br>Longitude:-105.0196<br>Radius : 6.3m<br>Altitude : 4.5m |
|---|---|---|---|---|---|
| 👤 | Caller<br>Information | Personal Information | | | |
| | | Demographics | | | |
| 📍 | Location | | Name<br>Jane Doe | Birth Date<br>07-21-1984 | Gender<br>Female |
| | | | Height<br>5'0" | Weight<br>125lbs | Ethnicity<br>Puerto Rican |
| 🗺 | Caller Provided<br>Locations | | Occupation<br>Lawyer | URL<br>http://rapidsos.com | |
| | | Languages:<br>English, German | | | |
| | | Contact Information | | | |
| 📱 | Device | Phone Number<br>(318) 675-1234 | Notes<br>Personal (Cell) | Emails<br>jdoe@RapidSOS.com | Notes<br>Primary Email |
| | | Addresses | | | |
| 🚗 | Directions | Address<br>234 W 39th St, New York, New York, US 10018 | | | |
| | | Medical Information | | | |

APPARATUS AND METHOD FOR OBTAINING EMERGENCY DATA AND PROVIDING A MAP VIEW

CROSS-REFERENCE TO RELATED APPLICATIONS

The present application claims priority to U.S. Provisional Patent Application No. 63/148,581, filed Feb. 11, 2021, entitled "Apparatus and Method For Obtaining Emergency Data Related To Emergency Sessions", and further claims priority to U.S. Provisional Patent Application No. 63/133,045, filed Dec. 31, 2020 entitled "Apparatus, Systems and Methods For Providing Alarm and Sensor Data To Emergency Networks," both of which are assigned to the same assignee as the present application, and all of which are hereby incorporated by reference herein in their entirety.

FIELD OF THE DISCLOSURE

The present disclosure relates generally to emergency calls, enhanced 9-1-1 (E911) and next generation 9-1-1 (NG911) emergency networks, and more particularly, to determination and provision of location data and other data for emergency calls.

BACKGROUND

Despite advances that have been made in emergency network technology, emergency networks remain relatively ill-prepared and have not technologically advanced in step with the needs for the determination of the location of mobile devices as well as non-landline devices in emergency situations. Additionally, because of ubiquitous, yet constantly evolving communication technologies and applications, emergency networks are bombarded with emergency communications from a plethora of non-homogeneous sources. Traditionally, emergency networks received voice calls from landline telephones via a public switched telephone network (PSTN) from which determining the caller and the caller's location was relatively straightforward because PSTN telephones were at fixed locations and associated with a given subscriber. The advent of wireless communication introduced additional complexities due to the mobility of callers. With the further advent of mobile Internet connectivity, which enables "over-the-top" voice-over-Internet-protocol (VoIP) and other messaging application communications, further challenges were introduced with respect to locating callers.

BRIEF DESCRIPTION OF THE DRAWINGS

FIG. 18 provides an example of an emergency response application webpage graphical user interface (GUI) displayed on an emergency network entity.

FIG. 19 is an example of a graphical user interface provided by an emergency data manager.

FIG. 21 is an example of an emergency response application graphical user interface provided by an emergency data manager.

DETAILED DESCRIPTION

Figure 1:
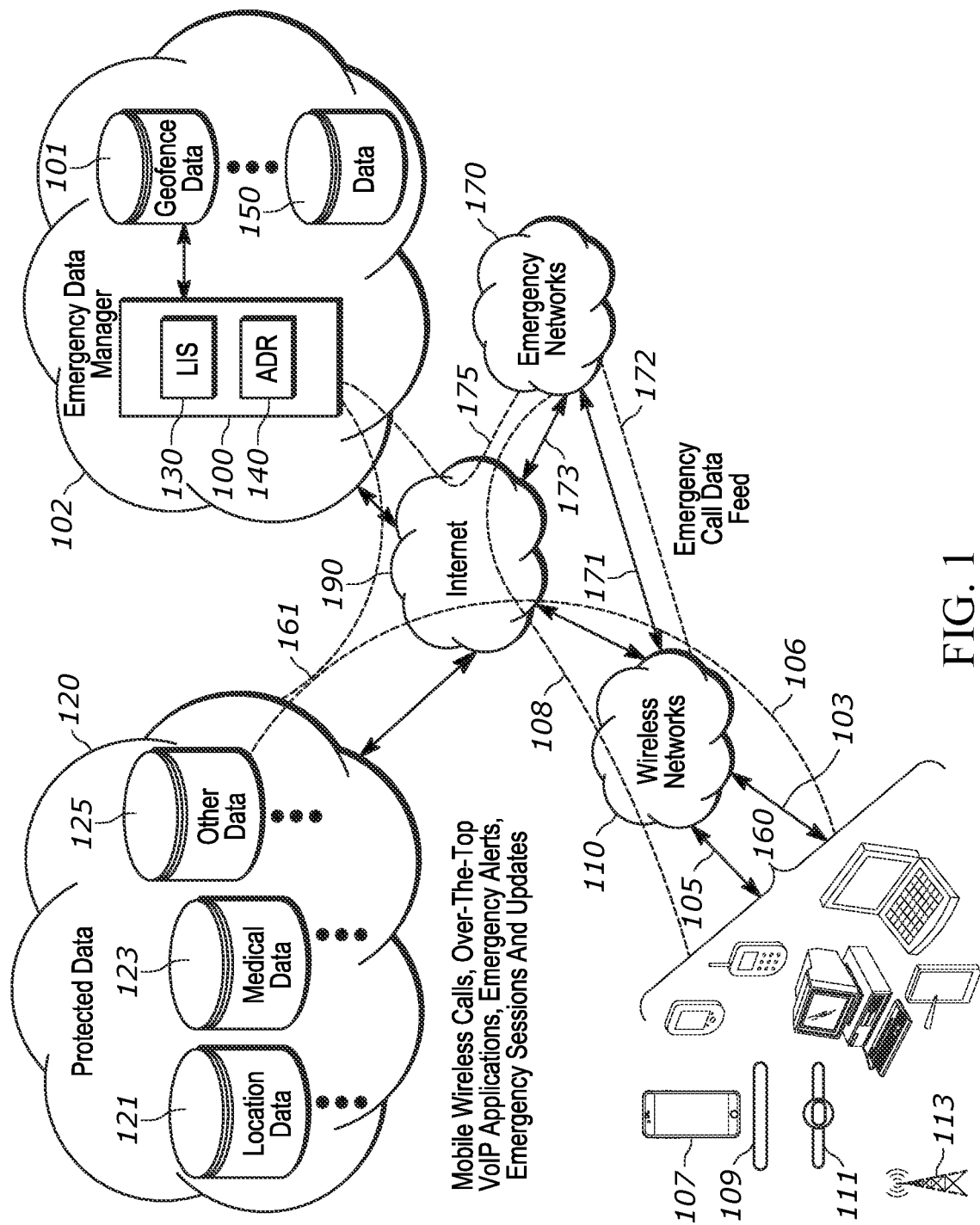
FIG. 1 is a diagram illustrating an emergency data management network in communication with various emergency networks.

Briefly, the present disclosure provides apparatuses, systems and methods of operation for obtaining emergency data including location data and other emergency data, and providing the emergency data to emergency networks independently from emergency call routing to the emergency networks. The emergency data may be obtained even in situations where emergency call routing to a particular emergency network is interrupted due to call routing network outages. The emergency data is sent to the emergency networks and may be displayed on emergency network entities of the emergency networks prior to the related emergency call routing completion to the emergency networks. In other words, emergency network entity operators can see emergency call data in advance of receiving the actual related emergency call. In some implementations, device identifiers are obtained from an emergency call data feed to an emergency network to relate emergency data with incoming emergency calls. The apparatuses, systems and methods of operation disclosed provide a map view on an emergency network entity, such as a workstation, showing location indicators from mobile devices from which emergency calls have been made.

One disclosed method includes: receiving emergency data related to emergency calls emanating from mobile devices, independently from emergency call routing to an emergency network; determining an emergency network that should receive the emergency data; providing the emergency data to the emergency network; and providing a map view to the emergency network entity of the emergency network using the emergency data and displaying location indicators corresponding to locations of mobile devices identified by the emergency data.

Another disclosed method includes: receiving emergency data related to emergency calls emanating from mobile devices, independently from emergency call routing to an emergency network; detecting emergency call data received at the emergency network; and providing a map view to an emergency network entity of the emergency network using the emergency data, the map view displaying location indicators corresponding to locations of mobile devices identified by the emergency call data received at the emergency network.

The method may further include: determining a portion of the emergency data corresponding to a group of emergency calls from mobile devices located in the emergency network's service zone; and sending the portion of the emergency data to the emergency network prior to detecting the emergency call data received at the emergency network for the group of emergency calls. The method may further include: determining emergency calls placed to the emergency network that have not yet been received by the emergency network by comparing emergency call data received at the emergency network with the emergency data; and providing an emergency call queue on a display of the emergency network entity using the comparison to visually distinguish emergency calls placed to the emergency network from emergency calls received by the emergency network. The method may perform determining a portion of the emergency data corresponding to a group of emergency calls from mobile devices located in the emergency network's service zone, by: determining that the location of each mobile device that placed an emergency call in the group of emergency calls is within the emergency network's service zone by checking a geofence database that defines the emergency network's service zone.

The method may further include: detecting the emergency call data by obtaining session initiation protocol (SIP) headers at a SIP gateway, by detecting an out-of-band signal on at least on trunked line to the emergency network, or both. The out-of-band signal may provide, for example, automatic location identifier (ALI) data. The method may further include: detecting emergency call data within computer aided dispatch (CAD) spill data sent to a dispatch workstation of the emergency network from an emergency call handling workstation of the emergency network. The method may further include: obtaining a dispatch workstation address from the CAD spill data; and providing the emergency data displayed on a display of a dispatch workstation identified by the CAD workstation address, where the dispatch workstation is the emergency network entity. The method may further include: determining an emergency type based on the emergency data; determining that additional emergency data is available based on the emergency type; and providing the additional emergency data to the emergency network entity. The method may further include: determining that multimedia data is available from a source in proximity to a mobile device location; establishing a multimedia streaming connection with the emergency network entity; and providing multimedia data to the emergency network entity over the multimedia streaming connection.

A disclosed apparatus includes: a network component, operative to support an Internet Protocol (IP) connection with a plurality of emergency network entities of an emergency network, and a remote emergency data manager; and a processor, operatively coupled to the network component. The processor is operative to: receive emergency data related to emergency calls emanating from mobile devices, independently from emergency call routing to the emergency network; detect emergency call data received at the emergency network; and provide a map view to an emergency network entity of the emergency network using the emergency data, the map view displaying location indicators corresponding to locations of mobile devices identified by the emergency call data received at the emergency network.

The processor may be further operative to determine a portion of the emergency data corresponding to a group of emergency calls from mobile devices located in the emergency network's service zone; and send the portion of the emergency data to the emergency network prior to detecting the emergency call data received at the emergency network for the group of emergency calls. The processor may be further operative to: determine emergency calls placed to the emergency network that have not yet been received by the emergency network by comparing emergency call data received at the emergency network with the emergency data; and provide an emergency call queue on a display of the emergency network entity using the comparison to visually distinguish emergency calls placed to the emergency network from emergency calls received by the emergency network. The processor may be further operative to determine a portion of the emergency data corresponding to a group of emergency calls from mobile devices located in the emergency network's service zone, by: determining that the location of each mobile device that placed an emergency call in the group of emergency calls is within the emergency network's service zone by checking a geofence database that defines the emergency network's service zone.

The processor may be further operative to: detect the emergency call data by obtaining session initiation protocol (SIP) headers at a SIP gateway, or by detecting an out-of-band signal on at least on trunked line to the emergency network, or both. The out-of-band signal may provide, for example, automatic location identifier (ALI) data.

The processor may be further operative to: detect emergency call data within computer aided dispatch (CAD) spill data sent to a dispatch workstation of the emergency network from an emergency call handling workstation of the emergency network. The processor may be further operative to: obtain a dispatch workstation address from the CAD spill data; and provide the emergency data displayed on a display of a dispatch workstation identified by the CAD workstation address, where the dispatch workstation is the emergency network entity. The processor may be further operative to: determine an emergency type based on the emergency data; determine that additional emergency data is available based on the emergency type; and provide the additional emergency data to the emergency network entity. The processor may be further operative to: determine that multimedia data is available from a source in proximity to a mobile device location; establish a multimedia streaming connection with the emergency network entity; and provide multimedia data to the emergency network entity over the multimedia streaming connection.

A disclosed system includes: emergency response logic that has a network component operative to establish an Internet connection to an emergency call handling workstation, a computer aided dispatch workstation (CAD) and a remote emergency data manager; and a processor, operatively coupled to the network component. The processor of the emergency response logic is operative to: detect computer aided dispatch (CAD) spill data sent to a CAD workstation from an emergency call handling workstation, in which the CAD spill data has at least one device identifier associated with an emergency call; send a query to the remote emergency data manager for location data using the at least one device identifier contained in the CAD spill data; receive location data in response to the query; and provide the location data to the CAD workstation on a map view within a browser window having an Internet protocol session with the remote emergency data manager.

The processor may be further operative to: detect a CAD workstation address in the CAD spill data; and provide the location data to the CAD workstation using the CAD workstation address. The emergency data manager is operative to: provide a graphical user interface to a plurality of CAD workstations via a web browser executing on each CAD workstation. The emergency data manager may be further operative to provide a unique map view to each CAD workstations based on the CAD workstation addresses detected in the CAD spill data. The emergency data manager may be further operative to provide the graphical user interfaces as a software-as-a-service graphical user interface. The emergency data manager may be further operative to provide an emergency call queue, where the emergency call queue for each CAD workstation is unique and is populated based on the CAD workstation address detected in the CAD spill data and the location data sent to the CAD workstation using the CAD workstation address. The emergency data manager may be further operative to provide the emergency call queue including emergency data obtained by the remote emergency data manager from mobile devices from which emergency calls have emanated. The emergency data manager may be further operative to provide the emergency call queue including selectable links to the emergency data.

Another disclosed method includes: receiving emergency data related to emergency calls emanating from mobile devices, independently from emergency call routing to an emergency call handling workstation; detecting automatic location identifier (ALI) data received by the emergency call handling workstation; and providing a map view to a dispatch workstation, the map view displaying location indicators corresponding to locations of mobile devices identified by the ALI data.

The method may further include providing the map view corresponding to a geographic dispatch area within which emergency calls are responded to by the dispatch workstation. The method may further include detecting the automatic location identifier (ALI) data within computer aided dispatch (CAD) spill data sent to the dispatch workstation from the emergency call handling workstation. The method may further include obtaining a dispatch workstation address from the CAD spill data; and providing the location data to a dispatch workstation identified by the CAD workstation address. The method may further include determining an emergency type from the CAD spill data; determining that additional emergency data is available based on the emergency type; and providing the additional emergency data to the CAD workstation. The method may further include: determining that multimedia data is available from a source in proximity to a mobile device location; establishing a multimedia streaming connection with the dispatch workstation; and providing multimedia data to the dispatch workstation over the multimedia streaming connection.

A disclosed apparatus includes: a network component, operative to support an Internet Protocol (IP) connection with a computer aided dispatch (CAD) workstation, and emergency call handling workstation, and a remote emergency data manager; and a processor, operatively coupled to the network component. The processor of the apparatus is operative to: detect automatic location identifier (ALI) data received by the emergency call handling workstation; obtain location data from the emergency data manager for mobile devices identified by the ALI data; and provide the location data to the CAD workstation for display in a map view displaying location indicators corresponding to locations of mobile devices identified by the ALI data. A disclosed system includes the apparatus and the remote emergency data manager. The emergency data manager is operative to: provide a map view to the CAD workstation within a web browser executing on the CAD workstation.

The apparatus processor may be further operative to: detect the automatic location identifier (ALI) data within computer aided dispatch (CAD) spill data sent to the dispatch workstation from the emergency call handling workstation. The processor may be further operative to: obtain a dispatch workstation address from the CAD spill data; and provide the location data to a dispatch workstation identified by the CAD workstation address. The processor may be further operative to: determine an emergency type from the CAD spill data; determine that additional emergency data is available from the emergency data manager based on the emergency type; and providing the additional emergency data from the emergency data manager to the CAD workstation.

The emergency data manager may be further operative to: determine that multimedia data is available from a source in proximity to a mobile device location; establish a multimedia streaming connection with the dispatch workstation; and provide multimedia data to the dispatch workstation over the multimedia streaming connection.

A disclosed system includes emergency response logic that has a network component, operative to establish an Internet connection to an emergency call handling workstation, a computer aided dispatch workstation (CAD) and a remote emergency data manager; and a processor, operatively coupled to the network component. The emergency response logic processor is operative to: detect computer aided dispatch (CAD) spill data sent to a CAD workstation from an emergency call handling workstation, the CAD spill data that has at least one device identifier associated with an emergency call; send a query to the remote emergency data manager for location data using the at least one device identifier contained in the CAD spill data; receive location data in response to the query; and provide the location data to the CAD workstation on a map view within a browser window having an Internet protocol session with the remote emergency data manager. The processor may be further operative to: detect a CAD workstation address in the CAD spill data; and provide the location data to the CAD workstation using the CAD workstation address.

The remote emergency data manager may be operative to: provide a graphical user interface to a plurality of CAD workstations via a web browser executing on each CAD workstation; provide a unique map view to each CAD workstations based on the CAD workstation addresses detected in the CAD spill data; and provide the graphical user interfaces as a software-as-a-service graphical user interface. The system remote emergency data manager may be further operative to: provide an emergency call queue, where the emergency call queue for each CAD workstation is unique and is populated based on the CAD workstation address detected in the CAD spill data and the location data sent to the CAD workstation using the CAD workstation address. The remote emergency data manager may be further operative to: provide the emergency call queue including emergency data obtained by the remote emergency data manager from mobile devices from which emergency calls have emanated. The remote emergency data manager may provide the emergency call queue including selectable links to the emergency data, and provide a web page tab opening in response to selection of a selectable link.

Turning now to the drawings wherein like numerals represent like components, FIG. 1 illustrates an emergency data manager 100 which is operative to communicate with various multiple Enhanced 9-1-1 (E911) or Next Generation 9-1-1 (NG911) emergency networks 170 via network connections 175. E911 and NG911 emergency networks are defined according to the National Emergency Number Association (NENA) standards which define applicable network architectures and protocols for communication between various network entities within the network architectures. For an NG911 network, NENA defines an Emergency Services IP Network (ESInet) as "a managed IP network that is used for emergency services communications, and which can be shared by all public safety agencies." The ESInet provides an IP transport infrastructure which enables deployment of independent application platforms and core services including, but not limited to, those needed for providing NG911 services. Nena defines the term, "ESInet" as designating the network, but not the services that "ride on" the network.

E911 and NG911 emergency networks are facilitated by an infrastructure which may include various distributed network entities such as, but not limited to, an Emergency Service Routing Proxy (ESRP) which routes IP based emergency calls to appropriate specific emergency networks of the emergency networks 170 based on, for example, a service area such as an emergency service zone. The ESRP operates as a Session Initiation Protocol (SIP) proxy for emergency calls originated using SIP. These distributed network entities may be cloud-based entities accessible via the Internet 190.

Each of the emergency networks 170 are owned and operated by emergency service providers (ESPs) which include various public and private ESPs such as a public safety answering point (PSAP), public safety services (PSS) as well as non-governmental, private ESPs. Put another way, an ESP is an organization that owns and operates an emergency network where the emergency network includes the infrastructure, network entities, communication devices and other equipment required to receive and handle emergency calls and emergency data and to provide emergency services within the ESP's service area, i.e. its emergency service zone. Emergency calls are routed to the emergency networks 170 via legacy 911 systems as well as from E911 and NG911 infrastructure which may include cloud-based network entities such as, but not limited to, cloud-based servers, routers, proxies, etc. that may be distributed and accessible via the Internet 190. Emergency calls may be routed to the emergency networks 170 from legacy 911 systems and equipment including trunked telephone lines from a public switched telephone network (PSTN), various wireless networks using trunked lines and Centralized Automatic Message Accounting (CAMA) and utilizing Signaling System No. 7 (SS7), CCITT number 7 (C7), and the like, etc. CAMA trunks include out-of-band signalizing with automatic number identification (ANI) or pseudo ANI assigned to a wireless emergency call by a wireless network. The emergency networks 170 receive an emergency call data feed 172 which provides location information for fixed wire telephones and mobile devices from which emergency calls have emanated, i.e. from which emergency calls have been made. In legacy 911 systems, the emergency call data feed 172 provides Automatic Location Information (ALI) in response to a query. Although E911 and NG911 IP based systems are still in the process of roll out, currently most emergency networks rely on legacy ALI data. In NG911 IP based systems the emergency call data feed 172 may be an XML based data feed, an HTTP data feed, SIP data feed or other suitable data feed format. Device identifiers present in an NG911 compliant SIP INVITE may also be used to establish an emergency call, and the emergency network may use the SIP INVITE device identifier to send and ALI query or use another modernized emergency call data feed 172 that utilizes XML, HTTP or SIP, etc.

In legacy 911 systems, after receiving an emergency call routed to an emergency network, the emergency network sends a query to an ALI database using the ANI information obtained in the out-of-band signaling related to the emergency call trunk in order to obtain a location for the emergency caller. The ALI database includes, or is associated with, a Master Street Address Guide (MSAG) database which provides street address information. The MSAG database is used during call routing to determine an appropriate PSAP to which an emergency call should be routed.

Additionally, if a phone number or ANI used to query the ALI database is not in the ALI database, an ALI Failure condition occurs. The emergency call in that case is routed to a default PSAP related to a general telephone switching group, and an operator has to speak with the caller to determine their location and which PSAP needs to respond based on that location information. If the caller is unable to speak, the operator would have no way of determining the caller's location.

In the case of wireless calls, the location information available for an emergency caller includes the wireless network transmission tower location at which the wireless network received the communication from the mobile device used to place the emergency call. Tower location is not sufficient to provide the emergency caller's actual location with enough accuracy to dispatch emergency responders. E911 Phase 2 location information uses radiolocation and/or GPS to get a more accurate location of the emergency caller's mobile device.

In FIG. 1, double arrowed lines represent operative coupling which may be implemented as backhaul connections between network entities, or as wireless connections between network entities and devices. Dotted lines in FIG. 1 represent network connections or data connections over which data may be sent and received by respective devices, network entities or by combinations of devices and network entities sending data to, and receiving data from, each other, accordingly. The network connections may be Internet connections and may further include Virtual Private Network (VPN) pathways or other secure connections.

The emergency data manager 100 is operatively coupled to emergency networks 170 via operative coupling which may be implemented as network connections 175 through the Internet 190. The network connections 175 may include an Internet protocol (IP) connection between each of the emergency networks 170 and the emergency data manager 100 and may be connection oriented or connectionless. For example, the network connections 175 may include IP connections which may include a TCP (Transmission Control Protocol, also referred to as Transport Control Protocol) connection, a UDP (User Datagram Protocol) connection or a combination of both such as UDP over TCP, etc., or a combination of TCP and UDP connections, etc. An IP connection may further employ one or more TCP sockets or one or more WebSocket connections. The emergency networks 170 may have backhaul connections 173 to the Internet 190. The emergency data manager 100 may operate as an interface between the emergency networks 170, databases 120 and devices 160, to provide emergency data to the emergency networks 170. The emergency data manager 100 may also be capable of accessing the emergency call data feed 172 via several example mechanisms disclosed herein.

The emergency data manager 100 provides a Location Information Server (LIS) 130 that provides emergency caller device location information to the emergency networks 170. However, the location information provided by the LIS 130 is independent from the emergency call routing of emergency calls to the emergency networks 170. Because of this capability, the emergency networks 170 can receive emergency call data prior to completion of emergency call routing and call answering by the emergency network. In cases where wireless network outages occur, an emergency network may still obtain information from the emergency data manager 100 via the LIS 130. The LIS 130 provides initial device location at the initiation of an emergency call, as well as location updates as the device moves.

The emergency data manager 100 also provides an Additional Data Repository (ADR) server 140 which may include "Additional Data" such as additional data for the call, additional data for the caller and additional data for the location. The ADR server 140 provides IS-ADR capability (Identity Searchable Additional Data Repository) however it can provide services for all incoming emergency calls whether or not the emergency calls are SIP based.

The emergency data manager 100 is operative to retrieve various types of "emergency data" (which includes "additional data") such as, but not limited to, location data, medical data, sensor data, camera data and other data, etc., determine the appropriate emergency network 170 authorized to receive specific emergency data, and provide that specific emergency data to the authorized emergency network. The emergency data manager 100 may, under some circumstances and for certain types of emergency data, store obtained emergency data in one or more databases such as database 150 which may be distributed databases. The ADR server 140 is operative to access database 150.

The emergency data manager 100 may communicate with, and retrieve and obtain data from, the various databases 120, and may also receive and store emergency data from the devices 160. The emergency data manager 100 is operative to determine the authorized emergency network using various mechanisms, one of which involves using a geofence database 101 which includes boundary information for some or all of the emergency networks 170 and also for national or regional emergency networks.

The various emergency networks 170 may include various public safety answering points (PSAPs). Each emergency network such as, but not limited to a PSAP, may include an emergency dispatch center and employ a computer aided dispatch (CAD) system. Each emergency network 170 includes various network entities such as at least one workstation, which may be a CAD system workstation, a call handling system workstation, an integrated call handling and CAD system workstation, or some other type of workstation, and which provides various graphical user interfaces (GUIs) on a display for use by emergency network personnel. The term "emergency network entity" refers to a hardware apparatus, including any necessary software or firmware, used to access or implement an emergency network such as, but not limited to, workstations, servers, routers, switches, laptops, desktop computers, etc. An emergency network entity hardware apparatus may therefore include software or firmware related to its emergency network function.

Each individual emergency network 170 may include an emergency call handling system which is operatively coupled to a PSTN (public switched telephone network) and various wireless networks 110 via appropriate backhaul connections 171 to a CPE (customer premises equipment). The PSTN and various wireless networks 110 provide, among other things, legacy emergency call routing of landline telephones and mobile telephones via, for example, CAMA trunks to the emergency networks 170.

The various emergency networks 170 are each operative to receive emergency calls 103 from a variety of devices 160 and a variety of device types. Each individual emergency network 170 may also receive emergency alerts 105 and establish emergency sessions 108 from the various devices 160 over the Internet 190 if those emergency networks are configured with the required capabilities. An emergency alert 105 may be sent as, for example, short message service (SMS) messages, SMS data messages, instant messages (IM), multi-media messages (MMS), email, or other formats of messages sent as Internet Protocol (IP) messages. For example, IP based messages may be sent using TCP, UDP, SIP, HTTP, or other mechanisms, etc. Emergency sessions 108 may also be established using these same, or other, IP protocols. An emergency session 108 refers to communication over an Internet connection between any the various types of devices 160 and an emergency network, where there is communication between one of the devices 160 and a particular emergency network of the emergency networks 170. One example of an emergency session 108 is a Voice-over-IP (VoIP) call using Session Initiation Protocol (SIP). Another example is an IP call using H.323 protocol, or some other communication protocol, etc. An emergency alert 105 is another example of an emergency session and may be, but is not limited to, data sent from a device 160 to a given one of the emergency networks 170. Because the emergency alert 105 will contain information that identifies the specific device 160 that sent the alert, the specific emergency network that received the emergency alert 105 may be able to respond to the device 160 by sending a response or acknowledgement message, or by making a call-back if the device 160 is for example, a mobile telephone such as a smartphone 107. The information that identifies a specific device 160 is referred to herein as a "device identifier." That is, a "device identifier" refers to information allowing identification of the device or a user of the device, such as for example, a phone number associated with a user, an email address, physical address, coordinates, IMEI number, IMSI, TMSI, IP address, BSSID, SSID or MAC address, etc.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on other sensor data such as via a smoke, carbon-monoxide, burglar alarm, or some other alarm, etc. In some situations, the user may confirm the emergency or provide authorization for sending the emergency alert 105.

Emergency data, such as enhanced location data, medical data, or other data, may be sent by device 160 in conjunction with an emergency alert 105, or may be sent as data updates 106 to a specific database of the various databases 120. The emergency data manager 100 facilitates getting the emergency data to an appropriate one of the emergency networks 170. The emergency data manager 100 is operative to communicate with the emergency networks 170 and to access and obtain emergency data and provide the emergency data to the emergency networks 170. For example, an emergency network may send an emergency data request to the emergency data manager 100 via the ADR server 140 such that the ADR server 140 may search or query the various databases 120 to obtain data sent by a device 160 at the time of, or prior to, sending an emergency alert 105. Alternatively, or additionally in some implementations, an emergency data request may be sent by the emergency data manager 100, over the IP connections 161, to the various databases 120 in response to an emergency alert 105 received by an emergency network.

The emergency data manager 100 or the emergency network may format stored emergency data or any received emergency data into a format that is compatible with industry standards for storing and sharing emergency data. For example, the emergency data may be formatted to be compatible with National Emergency Number Association (NENA) standards. Where emergency data is stored by the emergency data manager 100, emergency data requests may be sent to the emergency data manager 100 by the emergency networks 170 via, for example, HTTP GET requests. Emergency data requests may be sent from any one of the emergency networks 170 to the emergency data manager 100 and may utilize Location Information Server (LIS) protocol. For emergency data related to location, the data may include, but is not limited to, device generated location data (such as device 160 GPS chipset data), location information such as Location-by-Reference, Location-by-Value, etc. from, for example a, Location Information Server (LIS) or from other sources.

The various types of devices 160 that may communicate with the emergency networks 170 include, but are not limited to, desktop computers, laptop computers, tablets, mobile phones, smartphones 107, smartwatches 111 (or other health and medical tracking devices), medical bracelets 109, and various wired devices which may be Internet-of-Things (IoT) devices 113 which are operative to send and receive data from a wireless network such as, but not limited to, a $5^{th}$ generation mobile network (5G network). A medical bracelet 109 may be a type of IoT device in some instances. The medical bracelet 109 may be operative to transmit an emergency alert 105 to an emergency network. Emergency calls may also be made from landline phones connected to a PSTN and medical bracelet 109 and/or health monitoring device, such as a medical bracelet 109, may use a wireless access point connected to the PSTN to place an emergency call 103 or send emergency alert 105. Each of the devices 160 may also be operative to send data updates 106 via the Internet 190 to the various databases 120. The databases 120 may contain protected data in that the data is subject to various statutorily defined protections, such as, but not limited to, HIPPA, GDPR, or other statutorily defined data protection and data privacy requirements. The databases 120 may include location databases 121, medical databases 123 and other databases 125 with various personally identifiable data related to device 160 users. The data contained in the databases 120 is referred to as "emergency data" and may be retrieved by the emergency data manager 100 via an IP connection 161.

The emergency data manager 100 is included within an emergency data management network 102 which may be a distributed network and which may include one or more servers, and one or more databases such as geofence database 101 and additional data database 150. The emergency data manager 100 may be implemented as a server having at least one processor, or may be implemented as a distributed system with multiple servers, processors, memory and databases, and may further provide cloud-based, software-as-a-service (SaaS) features and functions.

Figure 2:
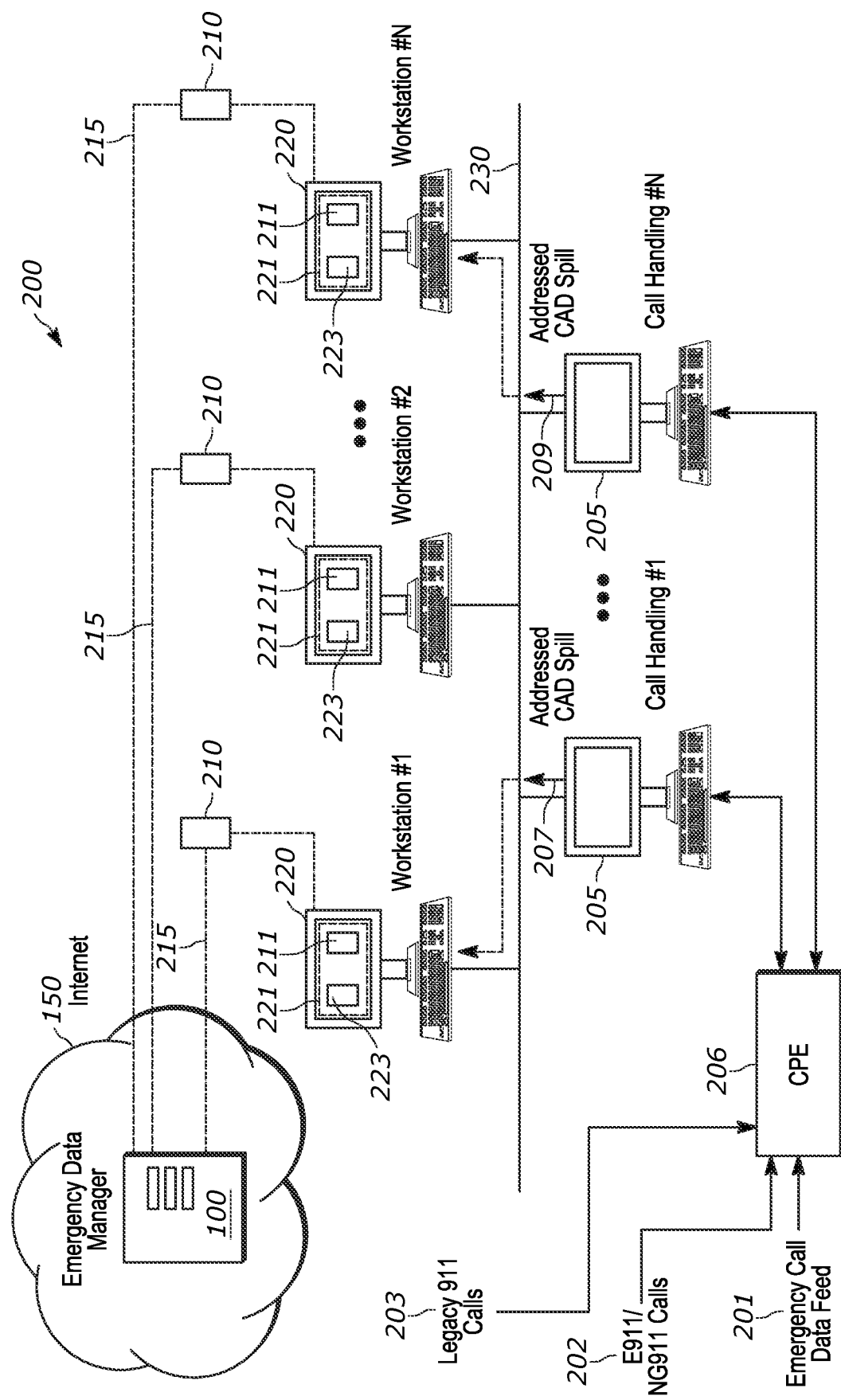
FIG. 2 is a diagram of an example emergency network having workstations in communication with an emergency data manager, and having an emergency response application in accordance with various embodiments.

FIG. 2 is a diagram of an example emergency network 200 in communication with an emergency data manager 100 via the Internet 190. The example emergency network 200 includes, among other things, one or more call-handling workstations 205 (#1 through #N) communicating with one or more computer aided dispatch (CAD) workstations 220 (#1 through #N).

Each CAD workstation 220 includes one or more processors that are operative to execute one or more applications such as emergency response application 210. The workstation includes a display 221 operative to display one or more graphical user interfaces (GUIs). In the example of FIG. 2, CAD application CAD software GUI 223 provides dispatch functionality and a GUI 211 is provided by the emergency response application 210 in accordance with various embodiments. The emergency response application 210 is operative to communicate with the emergency data manager 100. The GUI 211 may be referred to herein as an "emergency data manager portal GUI" or as an "EDM portal". In some implementations, the EDM portal GUI 211 may be presented on one of the call-handling workstations 205 and the emergency response application 210 may execute on the call-handling workstations 205. In some emergency networks in which call-handling and CAD are integrated onto a single workstation, the emergency response application 210 executes on the integrated workstation and provides the EDM portal GUI 211 on the integrated workstation display.

The emergency response application 210 is operative to retrieve and display emergency data provided by the emergency data manager 100 and display the emergency data on the GUI 211 including a map view. The map view displays emergency data and provides location indicators showing the location of mobile devices from which emergency calls have emanated.

In accordance with the various embodiments, the GUI 211 may be implemented in various ways such as, for example, provided as a web browser interface, such as a cloud-based application interface (i.e. a software-as-a-service SaaS interface), or via a web browser plug-in, or may be associated with a stand-alone application running as executable instructions, executed by one or more processors on a CAD workstation 220, or other workstation, on which the GUI 211 is displayed, or by any other software implementation mechanism.

Emergency services personnel may receive appropriate emergency services information and view emergency data including the map view via the GUI 211, and may use the CAD software GUI 223 to place dispatch calls to emergency responders who receive the dispatch calls and emergency data on various emergency responder devices accordingly. Emergency responder devices may include, but are not limited to, desktop computers, laptop computers, tablets, mobile phones, smartphones, radios (i.e. walkie-talkies), in-vehicle computers, etc., all of which may be operative to display emergency data to the emergency responders. The devices may be operative to send emergency data requests to a respective emergency network and also authentication data.

Emergency calls are routed to the emergency network 200 by the ESInet ESRP or by legacy 911 selective routers to customer premises equipment CPE 206. That is, emergency calls coming in to the CPE 206 may be CAMA trunk line calls (i.e. legacy 911 calls 203) or IP based calls (i.e. E911/NG911 calls 202) or a combination of both depending on the emergency network 200 specific implementation. The CPE 206 may include collectively various network entities such as internal call routers, private branch exchange (PBX) and any needed gateways, such as a SIP gateway to convert SIP to trunked line or vice versa, to accommodate incoming E911, NG911 or legacy CAMA trunks. The CPE 206 with any such internal network entities is collectively considered an emergency network entity of the emergency network 200. The CPE 206 routes the incoming emergency calls to the call-handling workstations 205 and provides emergency call data from the emergency call data feed 201 according to the emergency network 200 internal call handling system. The calls may be provided to the call-handling workstations 205 as trunked calls or IP based calls accordingly, and data from the emergency call data feed 201 is delivered to call-handling software executing on the call-handling workstations 205.

For legacy 911 systems, the emergency call data feed 201 is an Automatic Number Identification and Automatic Location Identification (ANI/ALI) feed which provides caller-ID and location information to the call handling workstations 205. For E911 or NG911 IP based incoming emergency calls the emergency call data feed 201 may be an XML based data feed, an HTTP data feed, SIP data feed or other suitable data feed format. In some implementations, a device identifier is present in a SIP INVITE used to establish an emergency call, and the emergency network may use the SIP INVITE device identifier to send and ALI query.

Some emergency networks may lack some next generation emergency network capabilities as the emergency networks evolve and progress to add this capability. For mobile device calls, and calls placed by mobile applications such as "over-the-top" VoIP applications, the legacy ANI/ALI feed may not include location information or may have incorrect location information because the devices, the applications placing the call, or both, may not be in compliance with the requirements for E911 or NG911. For SIP calls, the call may be translated to trunked lines at various points during call routing at which point information from the SIP INVITE can be lost. Over-the-top VoIP applications may enable phone calls to an emergency network but may not comply with the requirements of an emergency call placed using the native dialer of the mobile phone or may fail in acquisition of a location object such as PIDF-LO. In other situations, wireless network outages or other network and power outages may prevent emergency calls from being routed to the emergency network from a wireless network experiencing outages. In some of these situations, the emergency data manager 100 may still receive emergency data from mobile devices even when emergency call routing to the emergency networks is disrupted because the emergency data is received by the emergency data manager 100 independently from the emergency call routing. The EDM portal GUI 211 may therefore display a map view with location indicators from mobile devices from which emergency calls have emanated even if the emergency calls were not able to be routed to the emergency network due to network outages or power outages, of if emergency call data is lost during routing of the emergency call.

In the example emergency network 200, as emergency calls come in through the CPE 206, they are routed to the call-handling workstations 205 and emergency response call takers answer the emergency calls. The call-handling workstations 205 may display information related to answered emergency calls such as any called ID and location data information supplied through the emergency call data feed 201 if available. The call taker may manually enter additional information related to the call in some situations. The information associated with the emergency call answered by the call taker at the call-handling workstations is then passed to one of the CAD workstations 220 such that emergency response personnel may be dispatched to the scene of the emergency. The EDM portal GUI 211 may be implemented on the call-handling workstations 205 in some emergency networks, so that the call takers may see the map view with the location indicator for the emergency call they are answering. Also, in some emergency network implementations, call-handling and CAD functions may be integrated in a single workstation.

In the example emergency network 200 shown in FIG. 2, after the call taker has extracted any required information from the emergency caller and is ready to dispatch emergency personnel, the call taker selects a control, which may be a call-handling application soft button, for example, to invoke transmission of the emergency call information to a given CAD workstation 220. The information sent to the CAD workstations 220 is referred to herein as a "CAD spill." The CAD spill is an "addressed" CAD spill in that the data packets, or a data packet header, contains address information that associates the data packets with a specific CAD workstation 220. For example, addressed CAD spill 207 is addressed to CAD workstation #1, while addressed CAD spill 209 is addressed to CAD workstation #N (i.e. the "$n^{th}$" CAD workstation). The addressing may be performed manually based on the type of dispatch required, such as police, fire, ambulance, etc., or may be performed by a call-handling workstation and CAD workstation queuing algorithm.

The data in a CAD spill may include, but is not limited to, a device identifier, a type of emergency (i.e., fire, police, medical, etc.), severity, and location if location data is available from the emergency call data feed 201. The CAD spill data, including any location information that may have been provided in the emergency call data feed 201, may be displayed on a display 221 of an associated CAD workstation 220 via a CAD application which provides a CAD software GUI 223. As shown in FIG. 2 for example, the CAD spill 207 received by CAD workstation #1 may be displayed within the CAD application CAD software GUI 223 thereby enabling a dispatch operator to dispatch emergency personnel to the scene. However, the CAD software GUI 223 may not have location information for the emergency call, or the location information from the emergency call data feed 201 may be incorrect or incomplete.

The emergency response application 210 executing on the CAD workstations 220 is operative to detect the CAD spill 207 received by a CAD workstation 220, and to use the relevant emergency call data feed 201 data within the CAD spill 207 data to send an emergency data query to the emergency data manager 100. The emergency response application 210 communicates with the emergency data manager 100 through data connections 215 over which data may be sent and received via the Internet 190. The emergency data manager 100 may be a cloud-based software-asa-service (SaaS software) resident on a server that may be accessed through the Internet 190. The emergency response application 210 may be implemented as a stand-alone emergency response application residing on each CAD workstation 220, or may be an emergency response application plug-in for an associated web browser (i.e. a web browser plug-in) for communicating with the emergency data manager 100 SaaS software. The emergency data manager 100 may provide the emergency response application 210 as a cloud-based SaaS software application that may be accessed on any of the emergency network workstations using a web browser.

In other words, in some embodiments, the emergency response application 210 may be resident on the emergency data manager 100 and accessed via a web browser as an SaaS application, or may be implemented as a standalone emergency response application that communicates with the emergency data manager 100, or as a Web browser plug-in, any of which may provide the EDM portal GUI 211 enabling communication with the emergency data manager 100. In the Web browser plug-in implementation, a Web browser executing on the CAD workstation 220 communicates with the emergency data manager 100 and provides the GUI 211. In any implementation, communication is established between an emergency network entity, such as a workstation, and the emergency data manager 100 using an IP protocol stack and a network connection which may be a TCP connection and which may include one or more WebSocket connections. The connections may include cryptographic protocols such as TLS (Transport Layer Security) as well as other encryption and security measures.

The emergency response application 210 detects the addressed CAD spill 207 and uses the CAD spill 207 data via the emergency data manager 100 over the data connection 215 to determine if emergency data is available for mobile device identifiers in the emergency call data feed 201 data. In some implementations, this is accomplished by sending an emergency data query to the emergency data manager 100 where the emergency data query contains at least one mobile device identifier from the emergency call data feed 201 data.

The emergency data query may include the device identifier, any location data that may have been received through the emergency call data feed 201, and any other information such as emergency type, emergency severity, etc. The emergency data manager 100 is operative to receive device 160 location data, and other emergency data, from the various databases 120 which may include for example, but are not limited to, Android Mobile Location (AML) databases, Android Emergency Location Service (ELS) databases, and Hybridized Emergency Location (HELO) databases provided by iOS™ devices, and other mobile device location databases, etc. The emergency data manager 100 uses the data from the emergency call data feed 201 to identify emergency data associated with device identifiers and can match up data from the emergency call data feed 201 with other available emergency data to provide more complete and accurate information to the emergency networks. The match up of emergency call data feed 201 with data received by the emergency data manager 100 enable identification of emergency calls that have been routed to the emergency network 200. However, the emergency data manager 100 information is not limited to emergency calls that have been routed to the emergency network 200. The emergency data manager 100 is operative to provide an emergency call queue and a map view showing location indicators for devices from which emergency calls have emanated independently from the emergency call routing. In other words, the EDM portal GUI 211 can display an emergency call queue along with a map view having location indicators for all mobile devices from which emergency calls have emanated, i.e. from which emergency calls were made, that are within the emergency call routing area for the specific emergency network.

This capability may be implemented in various ways. In one example implementation, the emergency data manager 100 pushes all emergency data it receives to the emergency network to which the emergency data pertains. Each workstation, whether call-handling, CAD, etc., that displays the EDM portal GUI 211 will display an emergency call queue showing entries for all of the mobile devices whether nor not the emergency call was received and answered at the emergency network. Referring to FIG. 1, the emergency data manager 100 may determine which emergency network should receive what emergency data based on each mobile device's location and whether it is located within an emergency network geofence specified in the geofence database 101. Alternatively, where an emergency network may not have a specified geofence in the geofence database 101, the emergency data manager 100 may use a reference source such as, but not limited to, a NENA PSAP Database Tool, for example the Enhanced Public Safety Answering Point (PSAP) Registry and Census (EPRC), which is a secure web-based tool that was developed in 2019 and which contains information for PSAPs throughout the United States.

The initial emergency call queue may be displayed in a distinct color or font style such that the emergency network operators understand that the queue is for calls not yet received. As the emergency response application 210 detects emergency calls arriving at the emergency network CPE 206 by monitoring the addressed CAD spills 207, the emergency response application 210 can either change the distinct color or font style for queue entries related to calls that have been received by the emergency network 200 and make the change appear on the EDM portal GUI 211, and/or can change the appearance of queue entries based on the addressed CAD spill 207 at a specific CAD workstation 220 such that the EDM portal GUI 211 is individualized for emergency calls being handled at the specific CAD workstation 220. In another implementation, the emergency response application 210 can create a separate emergency call queue on the EDM portal GUI 211 that is specific to the workstation on which it is displayed. The specific emergency call queue can display, for example, only emergency call related to device identifiers received by the specific workstation in the addressed CAD spill 207.

The emergency response application 210 may send data from the emergency call data feed 201 to the emergency data manager 100 in a streaming manner, or as a data push operation, as the data is obtained from either the emergency call data feed 201 directly or from addressed CAD spill 207 data.

In response to receiving data from the emergency call data feed 201 whether sent in a data stream, as a push operation, or as an emergency data query sent by the emergency response application 210, the emergency data manager 100 provides, or returns in response to a query, emergency data which includes, but is not limited to, augmented device location information and other additional data. The emergency response application 210 receives augmented device location data and any other emergency data as additional data from the emergency data manager 100 and displays the emergency data in the EDM portal GUI 211 which may be displayed on a display of a CAD workstation 220. Augmented device location information in EDM portal GUI 211 may be shown on the same display 221 with unaltered device location information supplied by the emergency call data feed 201 in the CAD software GUI 223. A determination may be made of a location of the device based on a difference between the augmented device location and the unaltered device location information. In some implementations the emergency response application 210 is operative to receive and display a URL with the augmented device location information. The URL may be displayed within the CAD software GUI 223 or within the EDM portal GUI 211. The EDM portal GUI 211 may provide an emergency call queue, along with a map view, that provides URLs that may be selected (i.e. clicked) to open a web tab or new web page with further information stemming from the emergency data.

Figure 3:
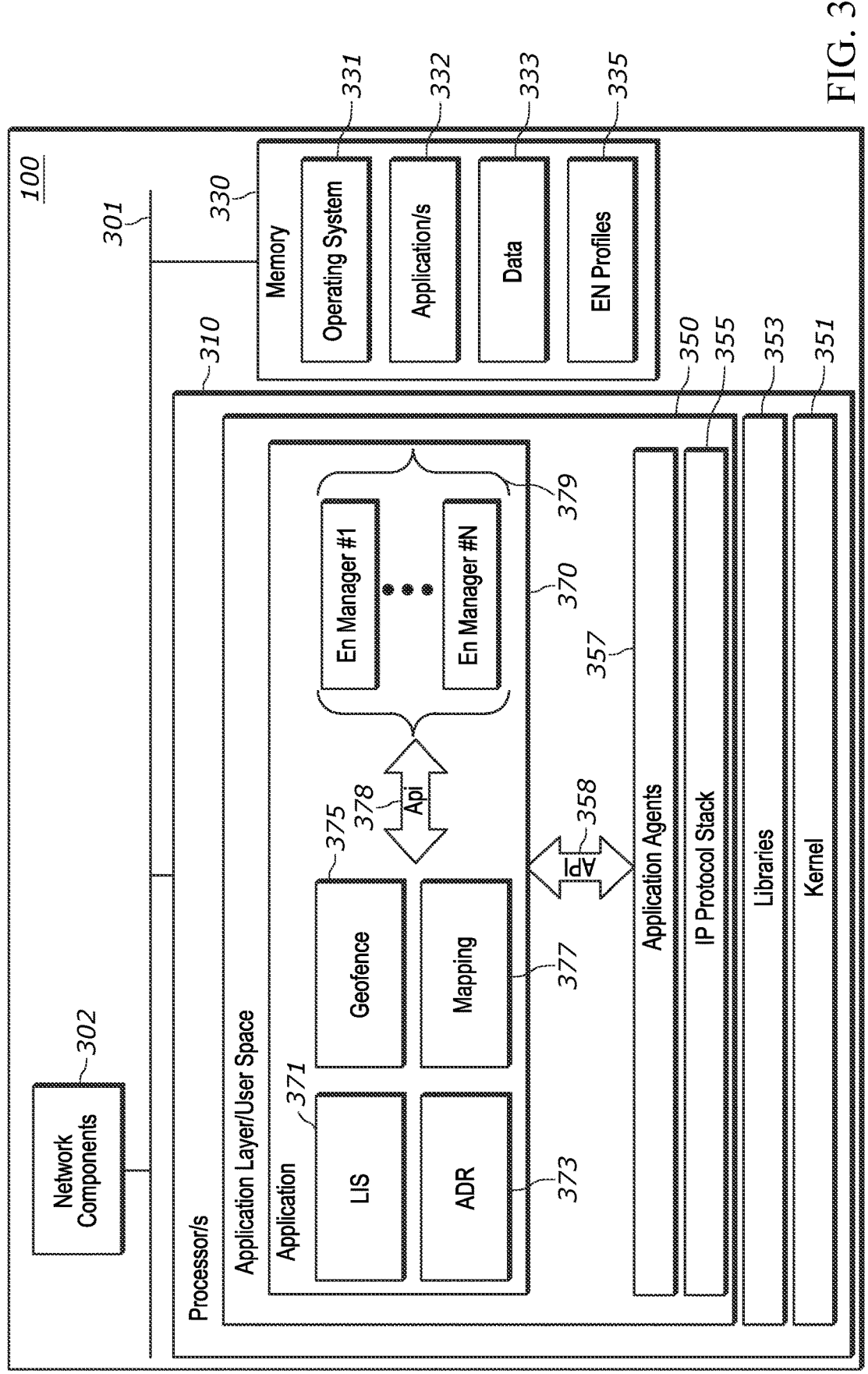
FIG. 3 is a diagram illustrating an example emergency data manager.

FIG. 3 provides an example implementation of the emergency data manager 100 shown in FIG. 1 and FIG. 2. The emergency data manager 100 includes network components 302, at least one processor 310, and at least one non-volatile, non-transitory memory 330 in addition to RAM (random access memory). The network components 302 may include one or more network transceivers for Ethernet connectivity to other network entities and an Internet connection. The memory 330 stores executable instructions and data such as executable instructions for an operating system 331 and various applications 332. The memory 330 also stores data 333 which may provide a location and geofence data cache, other data caches and other data, etc.

The processor 310 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 310 is configured and operative to fetch and execute computer-readable instructions (i.e. executable instructions) stored in the memory 330. For example, the operating system 331 executable instructions, when executed by the at least one processor 310, may provide a kernel 351, libraries 353 (i.e. application programming interfaces or "APIs"), an application layer 350 or "user space" within which the various applications are executed, and an IP protocol stack 355. The applications 332 executable instructions, when executed by the at least one processor 310, enable data retrieval and data ingestion operations, a LIS 371, an ADR server 373 a geofence module 375, a mapping module 377, and one or more emergency network managers 379. Emergency network profiles 335, stored in memory 330, may be accessed by the various modules and the emergency network managers 379 to access information needed to communicate with various emergency networks. The emergency network managers 379 communicate with the other modules of application 370 via a set of APIs 378. The processor 310 may further execute a set of application agents 357 which facilitate communication between the IP protocol stack 355 and the application 370 via various APIs 358. The application agents 357 are operative to, among other things, provide API communication between the various applications 332 and the kernel 351.

The emergency data manager 100 may be implemented as a cloud server. The term "cloud server" as used herein, refers to a server, accessible by an Internet connection, that is operative to host one or more applications that may be accessed by a computing device using a web browser or an application resident on the computing device. One type of computing device that may access the applications is an emergency network entity such as, but not limited to, a workstation. The emergency data manager 100 is operative to provide a cloud-based application such as a software-as-a-service (SaaS) application accessible remotely using a computer or workstation connected to the Internet and operatively coupled to the emergency data manager 100. The emergency data manager 100 may be implemented as SaaS software executed using a platform-as-a-service (PaaS) that enables development and execution of cloud-based applications. Some or all of the emergency data manager 100 functions may be distributed functions that are distributed on multiple servers in order to increase availability and redundancy in the SaaS environment.

All of the components of the emergency data manager 100 are operatively coupled by an internal communication bus 301. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 3. A "module" as used herein may be a software component. A "server" as used herein may be a software component or a combination of hardware and software. In the example emergency data manager 100 shown in FIG. 3, the LIS 371, ADR server 373, geofence module 375, mapping module 377, and one or more emergency network managers 379 are all operatively coupled to each other via APIs 378 and are operatively coupled to the IP protocol stack 355 and to the application agents 357 via APIs 358.

All of the servers, components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof. That is, any of the components or modules disclosed herein may be implemented using an ASIC, DSP, FPGA executable instructions executing on a processor, logic circuitry, or combinations thereof. In other words, the components and modules may be implemented as hardware, software or by combinations thereof. Therefore, each of the servers, components and modules disclosed herein may be considered a type of apparatus that may be implemented and operate independently from the other components in the system. For example, any one of the LIS 371, ADR server 373, geofence module 375, mapping module 377, or emergency network managers 379 may be implemented using an ASIC, DSP, FPGA, executable instructions executing on a processor, logic circuitry, or combinations thereof.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, solid-state storage (SSS), programmable chips such as EEPROMS, flash ROM (thumb drives), compact discs (CDs) digital video disks (DVDs), optical drives, etc., that may be used to load executable instructions or program code to other processing devices or electronic devices such as those that may benefit from the features and methods of operation herein described. The executable instructions may also include the various operating system environments and the kernel. For example, the memory 330, which is a non-volatile, non-transitory memory, may store executable instructions for execution by the at least one processor 310 that when executed, provide the LIS 371, ADR server 373, geofence module 375, mapping module 377, or emergency network managers 379.

In some implementations, the emergency data manager 100 is operatively coupled to a geofence database 101 which stores jurisdictional boundary data for various emergency networks 170 as well as for the national or regional emergency networks. The emergency data manager 100 is operative to store and retrieve emergency data from the various databases 120, and may function as an interface between emergency networks, the various databases 120 and devices 160 to receive and store emergency data. The stored emergency data can be transmitted or distributed to emergency networks and emergency responder devices before, during, or after emergencies. The emergency data manager 100 may receive emergency data from any of the devices 160 and such data may include, but is not limited to, locations, medical history, personal information, or contact information.

The emergency data manager 100 is operative to perform operations that include data ingestion and data retrieval. The emergency data manager 100 is operative to perform data ingestion by communication with the various databases 120 to obtain emergency data. The LIS 371 can perform location ingestion and supports interfaces operative to post or receive emergency locations. The LIS 371 may perform location ingestion using a REST API that is operative to receive an HTTP POST including location data when an emergency alert 105 is generated or when an emergency call 103 is received from a device 160 or from another server or database to which a device 160 has sent its location information. The location data may include a location generated concurrently or in response to the generation of the emergency alert 105, which may initiate an emergency call 103 or emergency session for requesting emergency assistance. This generated location data may be, for example, location data from a device 160 GPS chipset, such as GPS coordinates, or mobile device generated location data that is calculated by algorithms operating on the mobile device such as, but not limited to, triangulation. This data may also include data from a device 160 inertial-measurement-unit (IMU). The location data may be generated before an emergency alert 105 such as, for example, when a medical bracelet IMU detects that a patient has fallen. In another example, when an emergency call 103 is made from a device 160, the LIS 371 may receive a location recently generated by the device 160 GPS chipset, or by a device 160 triangulation algorithm, or other device 160 location mechanism, thereby ensuring that a location for the emergency is available as quickly as possible. The location data may include a device-based hybrid location generated by a device 160 which has sent an emergency alert 105 where the hybrid location data includes GPS data or is a combination of location determinations using one or more algorithms or one or more algorithms plus GPS data. A GPS chipset within the device 160 may generate the location data. The location data may also include a location data generated by a second device 160 that is communicatively coupled to the device 160 that sent the emergency alert 105. For example, a wearable device such as a medical bracelet or smartwatch, that does not include location capabilities, may use the location services location from a mobile phone with which it is paired. The LIS 371 may communicate with a device 160 via a mobile application installed on the device 160 or via firmware or an operating system of the device 160.

The location data generated by a device 160 prior to an emergency occurrence may be accessible by an authorized one (based on device 160 location) of the emergency networks 170 during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device 160 after an emergency has commenced may be made accessible to one of the emergency networks 170 during the on-going emergency. For example, updated location data of a hijacked taxi may be periodically transmitted to the emergency data manager 100 and made accessible to one or more of the emergency networks 170.

The ADR server 373 may provide an interface for posting or receiving static or dynamic emergency profile data. Such additional data may include, but is not limited to, medical data, personal data, demographic data, and health data, which may be obtained from the various databases 120. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices 113, and wearable devices such as medical bracelet 109, smartwatch 111 or other devices, etc. For example, intelligent vehicle systems may generate and send data regarding a crash, such as the speed at which the vehicle was moving just before the collision, where the vehicle was struck, the number of occupants, etc. The ADR server 373 interfaces may be implemented in whole or in part using a REST API, for example using JSON (JavaScript Object Notation).

In one example of operation, if an emergency call 103 is made from a mobile phone, or if an emergency alert 105 is sent, the mobile phone may receive a heart rate of the person who made the emergency call from a smartwatch 111 worn by the person and communicatively coupled to the cell phone via a Wi-Fi™ or Bluetooth™ connection or some other wireless connection. The mobile phone may therefore send the heart rate to the data ADR server 373, along with any other additional data, in an HTTP POST. The ADR server 373 may communicate with a device 160 via a mobile application installed on the device 160 or integrated into the firmware or operating system of the device 160. Additional data may also be sent to the ADR server 373 from a network server. The ADR server 373 may be accessed by any connected platform that receives data that might be relevant in an emergency. Connected platforms, such as the various databases 120, may therefore send additional data to the ADR server 373 at any time. A website, web application, or mobile application may communicate with the ADR server 373 and may allow device 160 users to create profiles to send additional data included in the profiles to the ADR server 373 every time a profile is created or updated.

The ADR server 373 may also include a multimedia ingestion module to provide an interface for posting or receiving data such as audio or video streams obtained during an emergency from a device 160 that is proximal to the emergency. In one example of operation, if an emergency alert 105 is generated by an intelligent vehicle system installed in a vehicle in response to the vehicle experiencing a collision, the emergency alert 105 is sent to one of the emergency networks 170 by the intelligent vehicle system or by another device 160 communicatively coupled to the intelligent vehicle system, such as a mobile phone coupled to the intelligent vehicle system via Bluetooth™. In response to generating the emergency alert 105, the intelligent vehicle system may additionally begin streaming audio and video from microphones and cameras installed inside or outside of the vehicle to the emergency data manager 100 through the ADR server 373. A mobile phone communicatively coupled to the intelligent vehicle system may additionally or alternatively stream audio or video from microphones and cameras integrated into the mobile phone to the emergency data manager 100 through the ADR server 373. One or more of the ADR server 373 multimedia ingestion modules or interfaces may be implemented wholly or partly using REST APIs that are accessed with an HTTP POST. Other ADR server 373 interfaces may include H.323 or some equivalent thereof.

After receiving the relevant data, the ADR server 373 can store the data in one or more databases operatively coupled to the emergency data manager 100 such as database 150. The emergency data manager 100 may be operatively coupled to databases such as, but not limited to, a location database, the geofence database 101, database 150, etc. The emergency data manager 100 databases may also be operatively coupled to, or otherwise accessible by, one of the emergency networks 170. The ADR server 373 is operative to tag or otherwise associate received data with an identifier of a user or specific device 160 associated with the data. For example, the ADR server 373 may tag received data with a user ID number, an email address, or a phone number (i.e. caller ID), a MAC address, or other device or user identification information, etc. The ADR server 373 may also tag received data based on the data source using, for example, a device name or type, an application name, user name, phone number, corporate account, or etc.

An individual or group of individuals may be associated with multiple identifiers. In an example of operation, if the LIS 371 receives a location generated by a phone associated with the phone number +1-555-555-5555, associated with John Doe, the data ADR server 373 may also receive a heart rate from a smartwatch associated with the email address jobndoe@email.com, which is an identifier that is also associated with John Doe. In this example, the LIS 371 tags the location with the phone number "+1-555-555-5555," and with the email address "johndoe@email.com," and the ADR server 373 tags the heart rate with the same identifiers, thereby associating both the location and the heart rate with John Doe in the emergency data manager 100 databases.

Ingestion data that enters the emergency data manager 100 may include various data fields and associated data entries within the data fields. The emergency data manager 100 maintains a list of expected data fields so that the data entries can be entered within a specific data field.

The LIS 371 may support interfaces implemented wholly or partly via a JSON REST API that is operative to receive a query or request such as, but not limited to, an HTTP GET request, from the emergency networks 170 or an ESP device. The LIS 371 data retrieval interface may provide a single GET endpoint for retrieving either the latest or paginated list of locations for a specific caller ID. For example, a phone number associated with a device 160 from which a location was received may be included in a header, body, or metadata of a request sent to the LIS 371. The LIS 371 may then retrieve a location or set of locations from the emergency data manager 100 databases and deliver the location or set of locations to the relevant authorized emergency network 170 or to an ESP device associated with the authorized emergency network. The LIS 371 may include a NG911 standards-based XML API for the retrieval of location data from the emergency data manager 100 databases. The LIS 371 may be operative to accept HELD requests from the emergency networks 170 or from ESP devices and to return location data for a specific caller ID or anonymous reference.

The ADR server 373 may include a data retrieval interface implemented as a JSON REST API for the retrieval of emergency or additional data. Additional data may include, but is not limited to, medical data, personal data, demographic data, health data or other data which may be protected data. Additional data may also include data received from connected devices 160 such as, but not limited to, vehicles, IoT devices, and wearable devices. The ADR server 373 may be operative to receive a query or request, such as an HTTP GET request, from an emergency network 170 or ESP device. The ADR server 373 may then, in response to a request, retrieve additional data associated with a specific or particular identifier of a user or a device 160 associated with the user, such as a phone number, and return the data to the emergency network 170 or ESP device.

The emergency data manager 100 determines which of the emergency networks 170 and associated ESP devices have authorization to receive particular types of emergency data. For example, a given emergency network or ESP device may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network, or associated ESP device, may be given differential access to the entirety of the emergency data, or to particular emergency data categories within the databases based on any factor or set of factors. A management portal may be provided by the emergency network managers 379 to determine which emergency data categories are returned from one of the emergency networks 170 to a particular emergency network or ESP device. Other data services corresponding to the various databases 120 may also be coordinated with respect to granting access to protected data. The emergency network profiles 335 stored in memory 330 may contain these settings related to release of data. The emergency network managers 379 also provide authentication and login capabilities for the various emergency networks and enable APIs 378 for communication between the emergency network entities and the LIS 371, ADR server 373, geofence module 375, and mapping module 377.

During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within the databases 120, retrieve and transmit the pertinent emergency data to the appropriate emergency network 170. The emergency data manager 100 may act as a data pipeline that automatically pushes emergency data to emergency networks 170 that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face.

The emergency data manager 100 is operative to provide a cloud-based application to multiple emergency networks 170 by establishing network connections via the IP protocol stack 355, with various emergency network entities such as a call-handling workstation, CAD workstation etc. Other examples of emergency network entities include, but are not limited to, customer premises equipment (CPE) (private branch exchanges, SIP gateways, etc.), servers, desktop computers, laptops, routers, switches, etc. that are operative to send and receive data. The network connections may be transport control protocol (TCP) connections and may utilize WebSocket connections between the emergency data manager 100 and an emergency network entity.

In some implementations, a geofence module 375 is present and is operative to determine emergency network jurisdictional boundaries and to show the jurisdictional boundaries on a graphical user interface as a jurisdictional map view within the EDM portal GUI 211. The mapping module 377 is operative to generate the map view and to also post emergency data locations as location indicators on the map view. The mapping module 377 is operative to generate a map view with or without the geofence module 375. For example, the map view may be generated using location data based on emergency call locations for mobile device identifiers received by the LIS 371. When geofence data is available for a given emergency network, the geofence module 375 will provide the emergency network jurisdictional boundary to the mapping module 377 to further enhance the map view displayed. In that case, emergency data may be provided only to emergency networks when the location data is within the jurisdictional boundary of the specific emergency network. The map view is operative to provide and display location indicators that show the location of incoming emergency calls that the emergency network has not yet received, has received, or is in the process of receiving. The not yet received calls can be displayed based on location information received by the LIS 371 because the location data is received prior to completion of emergency call routing to the emergency network.

Emergency networks and their corresponding emergency network entities are associated with a given geographic boundary. Based on the geographic boundary for a respective emergency network, a jurisdictional map view customized for the respective emergency network may be generated and provided to emergency network entities such as workstations for display. Within the jurisdictional map view for the emergency network, location indicators for emergencies occurring within its geographic boundary may be displayed. The jurisdictional map view for a given emergency network may include one or more geofences associated with the respective emergency network and surrounding areas.

In an example of emergency data manager 100 operation, an emergency alert may be triggered by a given device 160, for example by a user pressing a soft button, a physical button, initiating a voice command, or gesture, or autonomously based on sensor data such as from a smoke alarm. In this example, the user may be prompted to confirm the emergency or otherwise provide authorization for sending the emergency alert. Emergency data, such as an enhanced location and additional data regarding the user, such as the user's medical history, may then be delivered by the device 160 to the emergency data manager 100 and stored in a database. The emergency data manager 100 may format the emergency data into a format that is compatible with industry standards for storing and sharing emergency data. For example, the emergency data may be formatted to be compatible with National Emergency Number Association (NENA) standards. The emergency data manager 100 may perform a push operation to push the emergency data to an emergency network entity. After the push operation, the emergency data manager 100 may delete any temporarily stored data if required for compliance with privacy laws, regulations and policies.

An emergency network 170, such as by a PSAP responding to an emergency alert, may obtain emergency data by sending a query to the emergency data manager 100. The query may be an emergency data request using, for example, an HTTP GET request. The emergency data request may also be in the form required by the Location Information Server (LIS) protocol and/or a protocol required by the ADR server 373. In response to the emergency data request, the emergency data manager 100 sends an appropriate response including relevant emergency data to the requesting party via an encrypted pathway. The emergency data request may be in the form of an HTTP-Enabled Location Delivery (HELD) and the response from the emergency data manager 100 may be in the form of a Presence Information Data Format Location Object (PIDF-LO) as defined by the Internet Engineering Task Force (IETF).

The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security.

Figure 4:
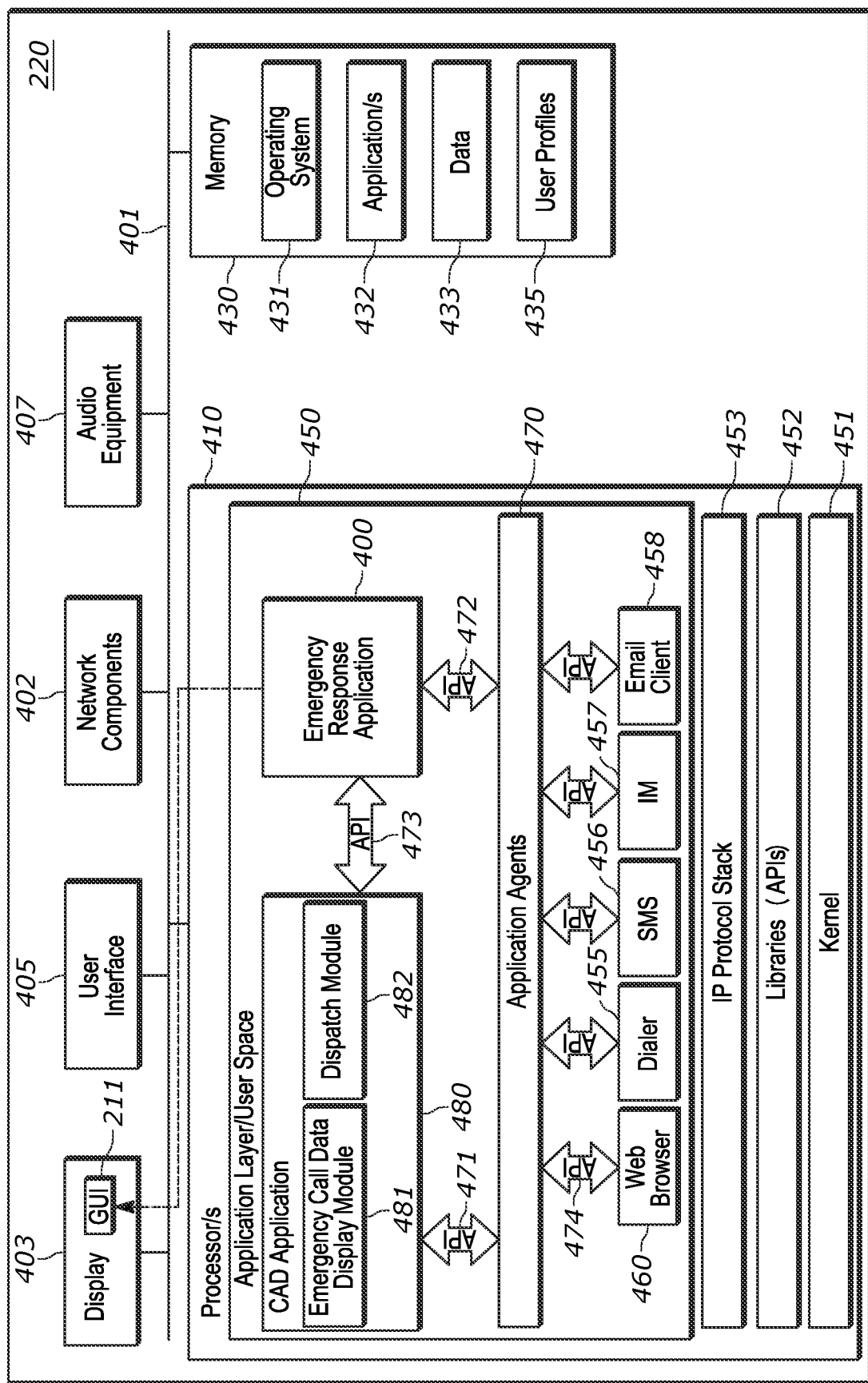
FIG. 4 is a diagram illustrating an example emergency network entity, which is a workstation with a stand-alone emergency response application in accordance with an embodiment.

FIG. 4 provides an example CAD workstation 220 which is one example of an emergency network entity. An emergency network may be implemented with multiple emergency network entities of various kinds and therefore may have multiple workstations for example one or more call-handling workstations, one or more CAD workstations, etc., in addition to routers, switches, hubs, access points, and other emergency network entities, etc. The example CAD workstation 220 may include a display 403, a user interface 405, audio equipment 407, network components 402, at least one processor 410, and at least one non-volatile, non-transitory memory 430 in addition to RAM. The network components may include one or more network transceivers for Ethernet connectivity to other workstations and devices and an Internet connection. The memory 430 stores executable instructions and data such as executable instructions for an operating system 431 and various applications 432. The memory 430 also stores data 433 which may provide data caching, and user profiles 435 with login, settings and security information. All components are operatively coupled to a processor 410 and to each other as needed via a communication bus 401.

The processor 410 may be implemented as one or more microprocessors, DSPs, ASICs, FPGAs, microcomputers, microcontrollers, digital signal processors, central processing units, state machines, logic circuitries, and/or devices that manipulate signals based on operational instructions. Among other capabilities, the processor 410 is configured and operative to fetch and execute computer-readable instructions (i.e. executable instructions) stored in the memory 430. For example, the applications 432 executable instructions, when executed by the at least one processor 410, may provide an operating system, a dialer application 455, a short-message-service (SMS) application 456, an instant message (IM) application 457, a web browser 460, an email client 458 and one or more instant message (IM) and voice applications which may each provide IM and voice call capability separately or in combination. The operating system may include a kernel 451, libraries 452 (also referred to as "application programming interfaces" or APIs) and an application layer 450 or user space within which the various applications are executed, and an IP protocol stack 453. Application agents 470 may be present to provide connectivity and interoperability via various APIs 474 between various applications and the CAD application 480 and the emergency response application 400. The emergency response application 400 may communicate with the application agents 470 via an API 472 and the CAD application 480 may communicate with the application agents 470 via an API 471. An API 473 may facilitate communication between the CAD application 480 and the emergency response application 400 and enable data exchanges to the user interfaces, access to emergency call data, etc.

In the example workstation 220 of FIG. 4, the applications 432 executable instructions, when executed by the at least one processor 410, provide a standalone emergency response application 400 with associated GUI 211, a computer aided dispatch (CAD) application 480 including an emergency call data display module 481, a dispatch module 482, and an associated CAD software GUI 223 (described in FIG. 2). In the example implementation illustrated in FIG. 4, the emergency response application 210 shown in FIG. 2 is operatively implemented as the standalone emergency response application 400 in accordance with an embodiment. The standalone emergency response application 400 is operative to detect a CAD spill sent to the workstation 220 by a call-handling workstation 205, and to communicate with the emergency data manager 100 to send emergency data queries using a device identifier in the CAD spill.

The emergency response application 400 provides the GUI 211 on the workstation display 403, and displays augmented emergency data such as, but not limited to, augmented location data received from the emergency data manager 100. Communication is established between the emergency response application 400 and the emergency data manager 100 using the IP protocol stack 453 and a network connection is established which may be a TCP connection and which may include one or more WebSocket connections.

Figure 5:
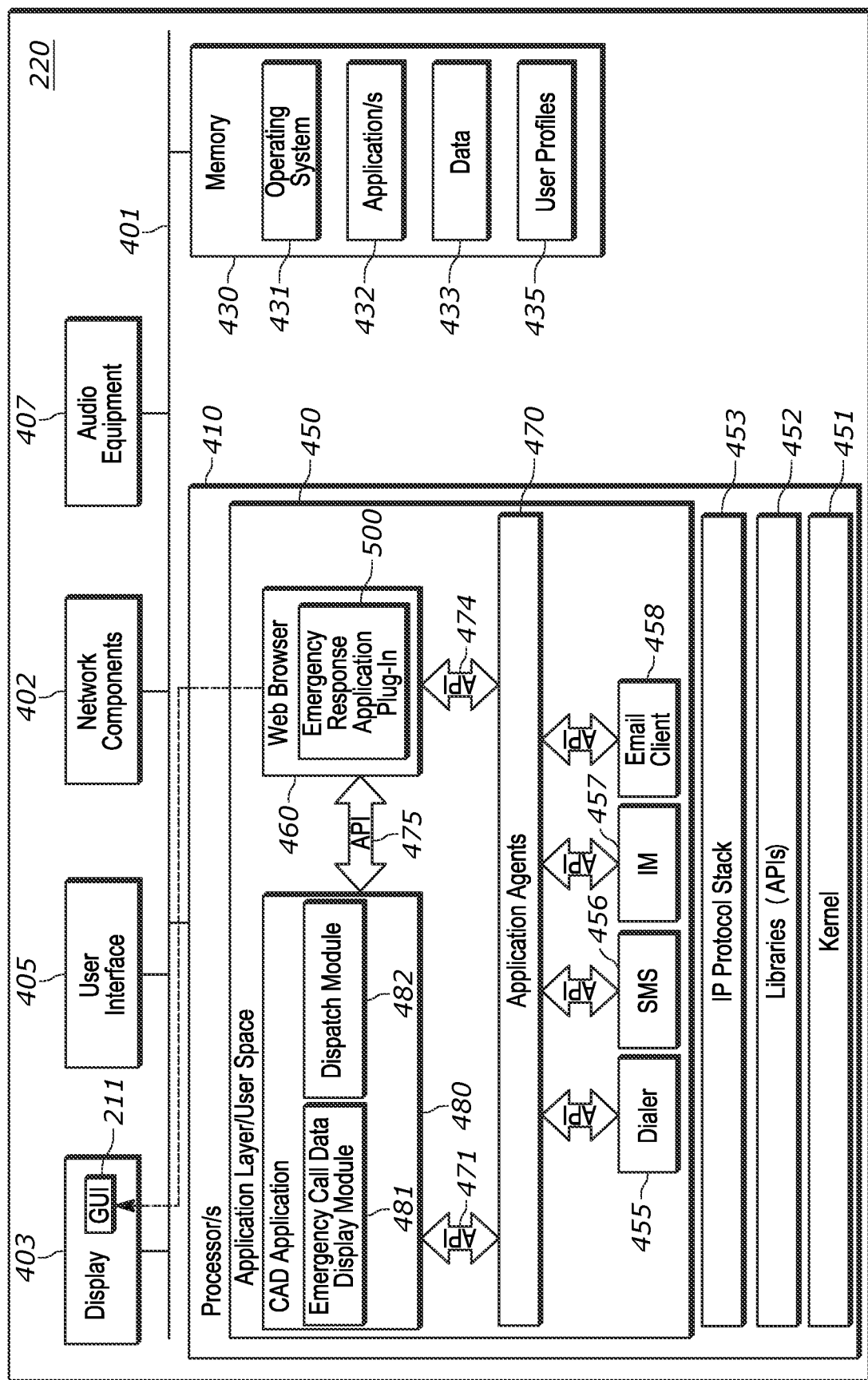
FIG. 5 is a diagram illustrating another example emergency network entity, which is a workstation including an emergency response application plug-in for a web browser in accordance with another embodiment.

FIG. 5 is a diagram illustrating another example emergency network workstation 220 having an emergency response application plug-in 500 with a web browser 460 in accordance with another embodiment. In the example implementation of FIG. 5, the web browser 460 communicates with the emergency data manager 100 to provide the GUI 211 as a SaaS interface. In other words, the emergency response application plug-in 500 is operative to detect a CAD spill sent to the workstation 220 by a call-handling workstation 205, and to communicate with the emergency data manager 100 to send emergency data queries using a device identifier in the CAD spill. The emergency response application plug-in 500 uses an established IP protocol stack 453 connection between the workstation 220 and the emergency data manager 100 using the web browser 460. The emergency data query sent to the emergency data manager 100 by the emergency response application plug-in 500 may utilize one or more WebSocket connections. An API 475 may facilitate communication between the CAD application 480 and the emergency response application plug-in 500 and enable data exchanges to the user interfaces, access to emergency call data, etc.

Figure 6:
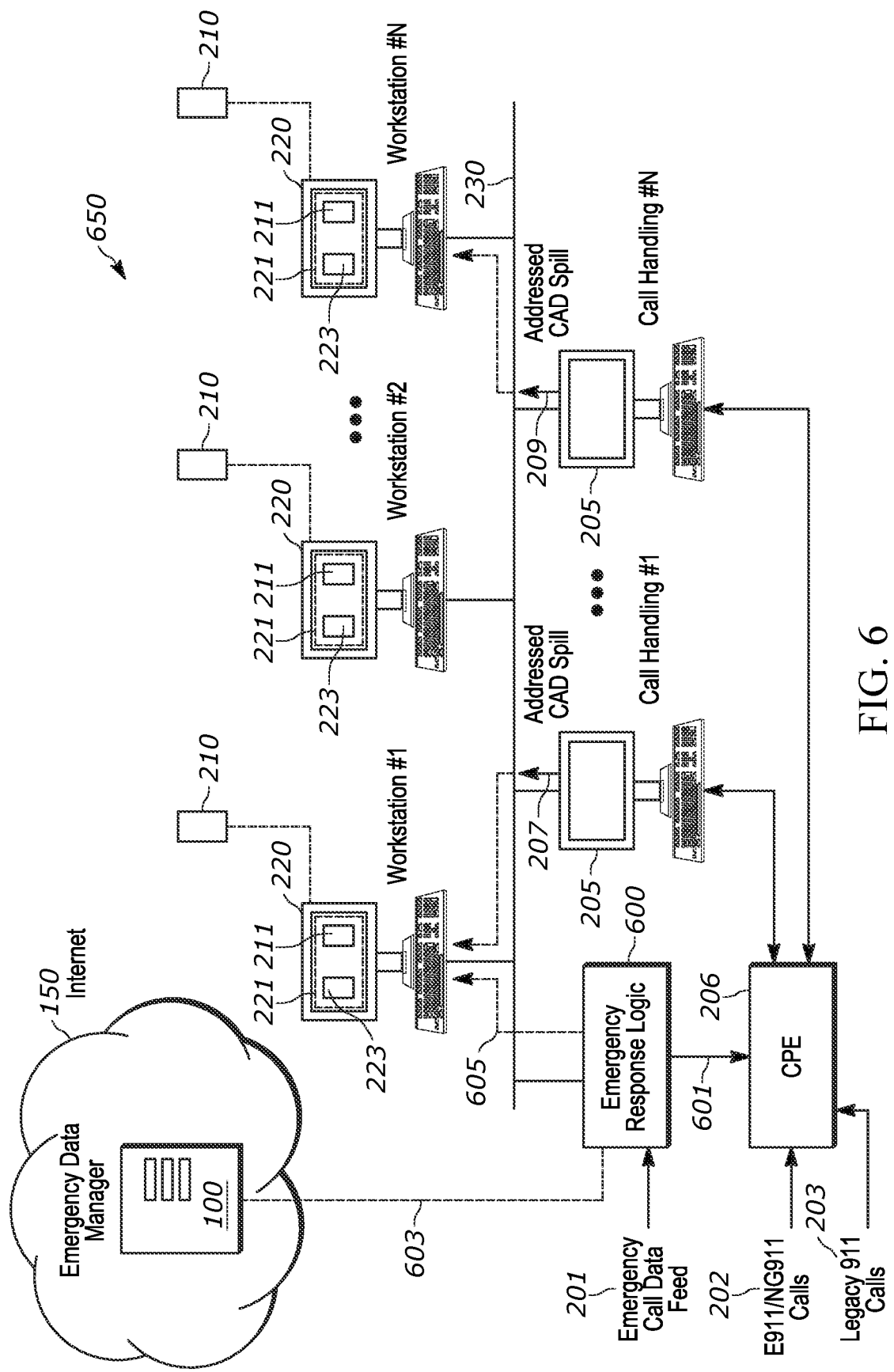
FIG. 6 is a diagram of an example emergency network in communication with an emergency data manager and having emergency response logic in accordance with an embodiment.

FIG. 6 is a diagram of an example emergency network 650 that includes emergency response logic 600 in communication with the emergency data manager 100 in accordance with an embodiment. The example emergency network 650 has a similar configuration to the example emergency network 200 illustrated with respect to FIG. 2. The CAD workstations 220, similar to the CAD workstations in FIG. 2, includes an emergency response application 210. However, different from the example emergency network 200 discussed with respect to FIG. 2, the implementation of the emergency network 650 includes emergency response logic 600.

The emergency response logic 600 is operatively coupled to the CPE 206 and to the emergency data manager 100 and is operative to receive the emergency call data feed 201, and to split the emergency call data feed 201 into two legs; one feed leg 601 is provided to the CPE 206 internal call routing, and a second feed leg 603 is provided to the emergency data manager 100. The second feed leg 603 is sent over an IP connection between the emergency response logic 600 and the emergency data manager 100. The emergency response logic 600 is operative to receive augmented emergency data such as, but not limited to augmented location data, from the emergency data manager 100 in response to sending the second feed leg 603.

The emergency response logic 600 may also facilitate data pushes from the emergency data manager 100 to the emergency network internal network 230 such that an emergency call queue and/or emergency alert queue can be displayed on each of the workstations within the EDM portal GUI 211. The emergency response logic 600 may use the emergency call data feed 201 to determine the emergency calls from the emergency call queue that have actual been received at the CPE 206 and to change the queue entry color, font style, or create a second emergency call queue, etc., to distinguish emergency calls that are not yet routed or received from emergency calls that have arrived at the CPE 206 and/or answered by operators of the call-handling workstations 205. The emergency response logic 600 may also monitor addressed CAD spill 207 and customize the EDM portal GUI 211 on each CAD workstation 220 according to the call identifiers sent to it in its respective addressed CAD spill 207. Put another way, the emergency response logic 600 can customize the EDM portal GUI 211 on each CAD workstation 220 to show specific information that that particular CAD workstation 220 needs related to emergency calls its operator is handling.

In various implementations, the emergency data manager 100 uses device identifiers contained in the feed leg 603 and sends back augmented emergency data such as augmented location data. For example, the emergency data manager 100 LIS server receives location data from each of the devices 160 when any one of them initiates an emergency session with the emergency network 650. The emergency data manager 100 is operative to associate the received location data with the device identifiers in the second feed leg 603 and accordingly return augmented location data, as well as other emergency data that may be available related to the device identifier via the ADR server. The emergency response logic 600 receives and provides the augmented emergency data, including augmented location data 605, to the CAD workstations 220. In the example emergency network 650, each CAD workstation 220 receives all augmented data. The emergency data manager 100 obtains the emergency data independently from the emergency network 650 and therefore independently from the emergency call routing to the emergency network 650. The emergency data manager 100 may receive emergency data from mobile devices prior to completion of call routing to the emergency network. In other words, the emergency data manager 100 may receive emergency data related to in-progress mobile device emergency calls before those emergency calls are received and answered by the emergency network call-handling systems.

In another implementation, the emergency response application 210, which executes on each of the CAD workstations 220, may be operative to receive the augmented emergency data in addition to an addressed CAD spill 207 data received from the call-handling workstations 205, and determine which augmented data to display on the EDM portal GUI 211 based on the CAD spill 207 data received at the specific workstation. For example, the emergency response application 210 may determine what augmented emergency data to display on the EDM portal GUI 211, by comparing device identifiers in a respective addressed CAD spill 207 to the augmented emergency data device identifiers received from the emergency response logic 600. For example, CAD workstation #1 may receive the addressed CAD spill 207 from call-handling workstation #1 as shown in FIG. 6. The emergency response application 210, executing on workstation #1, is operative to determine call identifiers received in the CAD spill 207, and to identify on the EDM portal GUI 211, corresponding augmented emergency data, such as augmented location data, from the augmented emergency data 605 provided by the emergency response logic to create a customized EDM portal GUI 211 emergency call queue and map view. The emergency response application 210 displays the augmented emergency data 605 on the EDM portal GUI 211 in a given font color, font style, or within a custom queue customized for that specific CAD workstation. In other words, the emergency data may be displayed in various ways in the EDM portal GUI 211 and this may be specified or customized by user preferences and setting. Additionally, an emergency call queue may be provided that contains URLs that link to additional emergency data. The map view that is displayed provides and displays location indicators showing locations of mobile devices from which emergency calls have been made.

In some implementations the augmented emergency data 605 may include, or may be provided via, a Uniform Resource Locator (URL) that may be provided as either a plain text URL or as a selectable web link, such as a Hypertext Transfer Protocol (HTTP) link. The URL may be inserted into the emergency call data feed 201 which is displayed on CAD software GUI 223, or displayed in the EDM portal GUI 211 or in both locations. The URL may be text only and not selectable, depending upon the implementation of the emergency call data feed 201 field displayed on the CAD software GUI 223.

In legacy systems using ANI/ALI as the emergency call data feed 201, the information elements sent over the network as well as data fields in the CAD software may provide for a limited number of text characters, such as 511 characters, and there may likewise be a limitation within an ANI/ALI display field within the CAD software GUI 223. In such cases, the URL may be shortened using a URL shortener service such that a reduced number of text characters is needed to display the URL. Because emergency response logic 600 adds the augmented emergency data 605 into the emergency call data feed 201 leg which is sent in the normal emergency network internal network 230 the CAD software receives it as it would normally receive the emergency call data feed 201 and displays it accordingly.

In some implementations the emergency call data feed 201 may support an XML ALI Query Service (AQS) and use an XML-based protocol that delivers XML ALI as a data stream that provides 2124 bytes that includes the legacy ALI data characters as well as characters required for XML tags and other XML data elements etc.

The CAD workstation 220 user may have several options to access the augmented emergency data 605 using the URL, or shortened URL as applicable. In one implementation, if the CAD software GUI 223 allows for display of HTTP links, the use may select the HTTP link which may then open another window or tab within the EDM portal GUI 211 via a default web browser. If the URL is displayed as plain text, the user may perform a copy and paste operation of the URL, copying from the CAD software GUI 223 display field and pasting it into the address field of another web browser page or tab, or may type in the URL manually.

Navigating to the URL by any of the above-described options will provide a web page that includes a display of the augmented emergency data 605. Because the URL enables a webpage, the augmented emergency data 605 is not limited to location data as would be the case with the character limitation of the ANI/ALI display field within the CAD software GUI 223. The web page can provide and display augmented emergency data 605 including for example, but not limited to, device-based location, sensor based location, location coordinates, WiFi™ access points, 5G access points, GPS coordinates, cell tower triangulation, barometric pressure, radio frequency signals, real-time sensor data, demographic data, pre-existing health information, emergency contacts, multimedia, social media information, weather data, environmental data, etc. The additional information may pertain to an individual emergency call or to a large-scale emergency event.

The URL is generated by the emergency data manager 100, and may be inserted into the emergency call data feed 201 by emergency response logic 600. Alternatively, the URL may be generated by the emergency response logic 600. The URL may be in any of various formats and may, for example, include the name or phone number of the emergency network to which the web link will be provided (e.g., www.CollierCounty911.5153402225.org). The URL may alternatively, or additionally include the phone number of a person who has dialed an emergency number (e.g., 9-1-1) in which case the phone number may be included in the emergency call data feed 201. The additional information provided by the webpage specified by the URL may also provide photographs or a video feed which may be recorded video or a live stream video. For example, where a witness of a car accident calls 9-1-1 and concurrently begins recording a video of the car accident on their mobile phone, the emergency data manager 100 may obtain the video information from a database and include the video as part of the augmented emergency data 605 accessible via the URL. In some implementations, the URL may direct the webpage to a database server external from the emergency data manager 100 or the emergency network. Therefore, the URL may be controlled by security or privacy protocols that disable the URL after some predetermined period of time, disable after access is completed, or limit access of the URL or sharing of the URL by only certain authorized emergency network entities or by a specified limited number of authorized users.

In another example use case, the URL may provide a map such as a floor plan within a building and identify the location of the device that placed an emergency call. The EDM portal GUI 211 may enable the CAD workstation 220 operator to send a text message to an emergency responder at the emergency scene such that the emergency responder could use their mobile device to access the webpage specified by the URL. Alternatively, the URL could be sent to all emergency responders who may be available to respond to a dispatch request.

Figure 7:
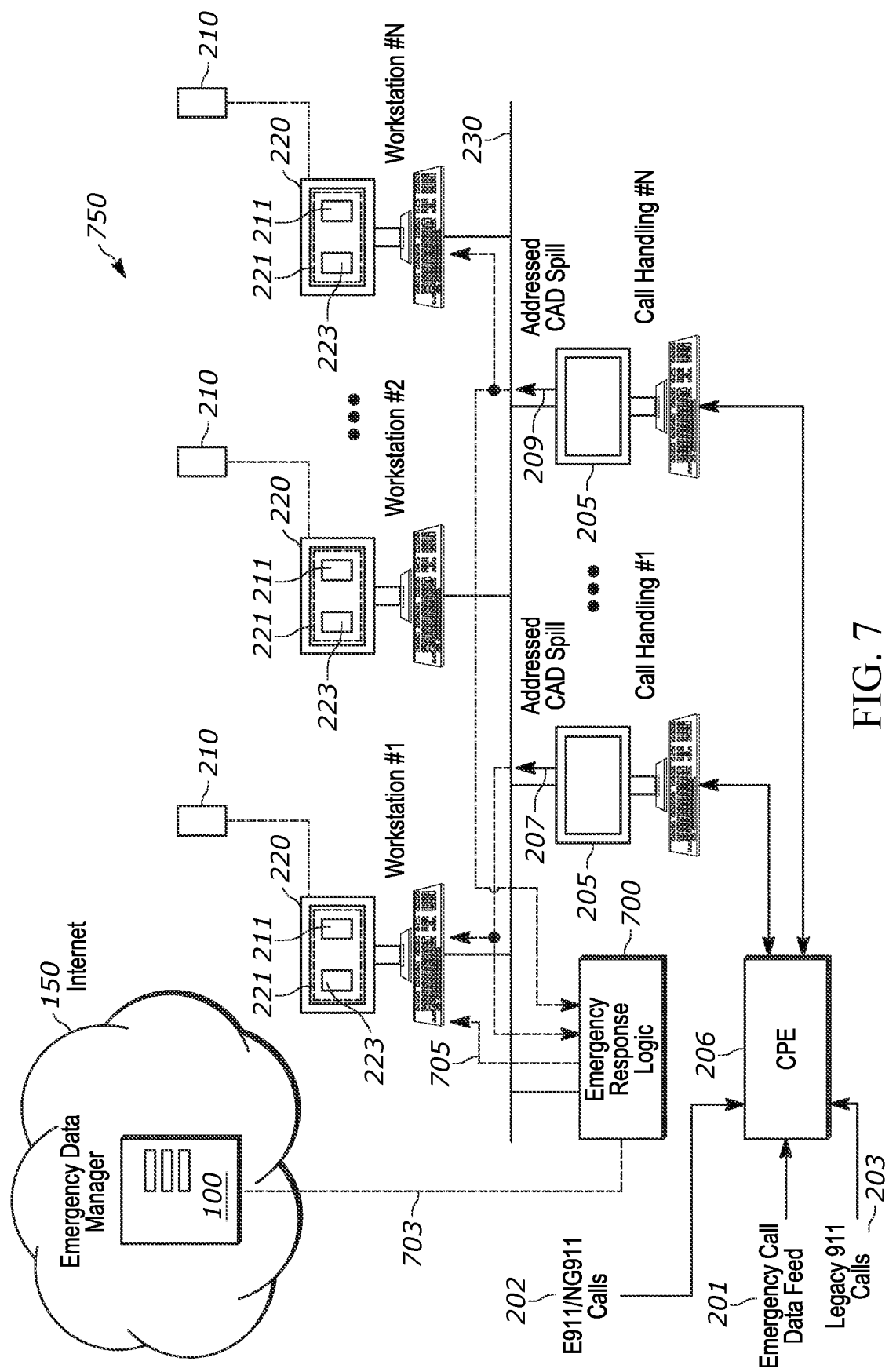
FIG. 7 is a diagram of another example emergency network in communications with an emergency data manager and having emergency response logic in accordance with another embodiment.

FIG. 7 is a diagram of an example emergency network 750 that includes emergency response logic 700 in communication with the emergency data manager 100 in accordance with an embodiment. In the implementation illustrated in FIG. 7, the emergency response logic 700 is operatively coupled to the emergency network 750 and is operative to receive addressed CAD spills from each of the call-handling workstations 205. Because the CAD spills include an address identifying the particular CAD workstation 220 to which a particular CAD spill is directed, the emergency response logic 700 likewise addresses the augmented emergency data 705. For example, the emergency response logic 700 may receive the addressed CAD spill 207 from call-handling workstation #1 which is addressed to CAD workstation #1. The emergency response logic 700 accordingly sends emergency data query 703 to the emergency data manager 100 via an IP connection, and receives back augmented emergency data including augmented location data. The emergency response logic 700 then provides the augmented emergency data 705 to CAD workstation #1. Likewise, the emergency response logic may receive the addressed CAD spill 209 from call-handling workstation #N (i.e. the and "n$^{th}$" call-handling workstation) and send the related emergency data query 703 to the emergency data manager 100. The emergency response logic 700 receives back augmented emergency data from the emergency data manager 100 in response to the emergency data query 703, which it will then provide to workstation #N. For each CAD workstation 220, the emergency response application 210 communicates with the emergency response logic 700 to receive the augmented emergency data and display it on the EDM portal GUI 211.

Figure 8:
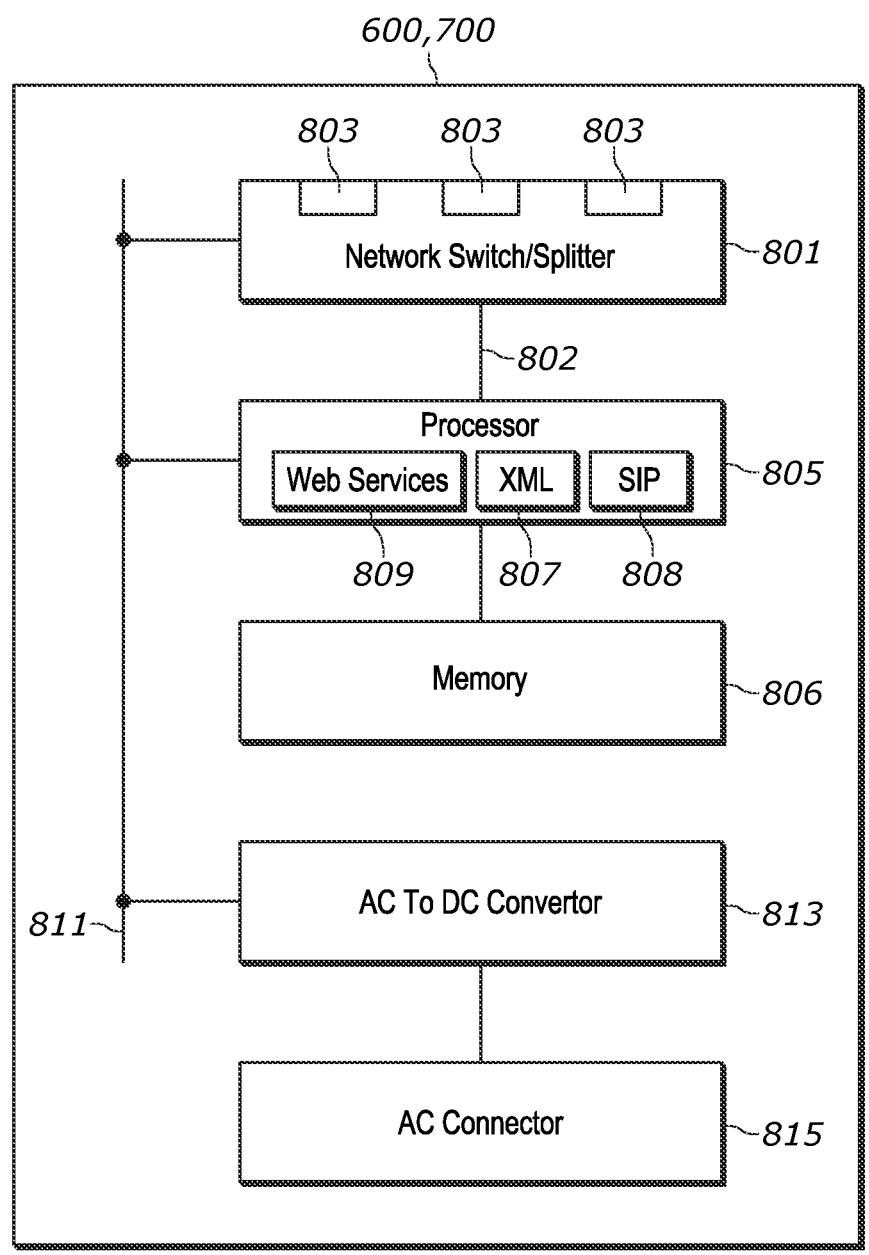
FIG. 8 is a diagram of an example of emergency response logic in accordance with some embodiments.

FIG. 8 is an example implementation of emergency response logic 600 and emergency response logic 700 in accordance with some embodiments. The example emergency response logic includes an AC connector 815, operatively coupled to an AC-DC converter 813 and a power bus 811, which provides power to network switch or splitter 801 and at least one operatively coupled processor 805. The network switch or splitter 801 includes a network interface and a plurality of ports 803, which are operative to connect to network cables such as Ethernet cables. The network interface is operatively coupled by a bus 802 to the at least one processor 805. Depending of the particular embodiments, the at least one processor 805 is operative to receive CAD spills from the call-handling workstations together with and the emergency call data feed, or only the emergency call data feed in some embodiments, and to communicate with the emergency data manager.

The processor 805 is operatively coupled to a non-volatile, non-transitory memory 806 which stores executable instructions, that when executed by the processor 805 implement an XML module 807, a SIP module 808 and a web services module 809. Each of these modules is operative to receive emergency call data feeds in various formats such as the legacy ANI/ALI feed, or XML or SIP information in NG911 systems.

The at least one processor 805 is operative to send an emergency data query to the emergency data manager 100 via an IP connection, and to receive back augmented emergency data including augmented location data and/or received pushed emergency data from the emergency data manager 100. The at least one processor 805 is further operative to communicate with the network interface within the network switch or splitter 801, to communicate with the CAD workstations 220 to provide the augmented emergency data and to address data to each of the CAD workstations 220 based on a CAD workstation address.

The processor 805 may be a system-on-a-chip and may include non-volatile, non-transitory memory to store firmware, software instructions or both. The processor may also be implemented as an ASIC, one or more FPGAs, DSP, etc. or some combination thereof.

Figure 9:
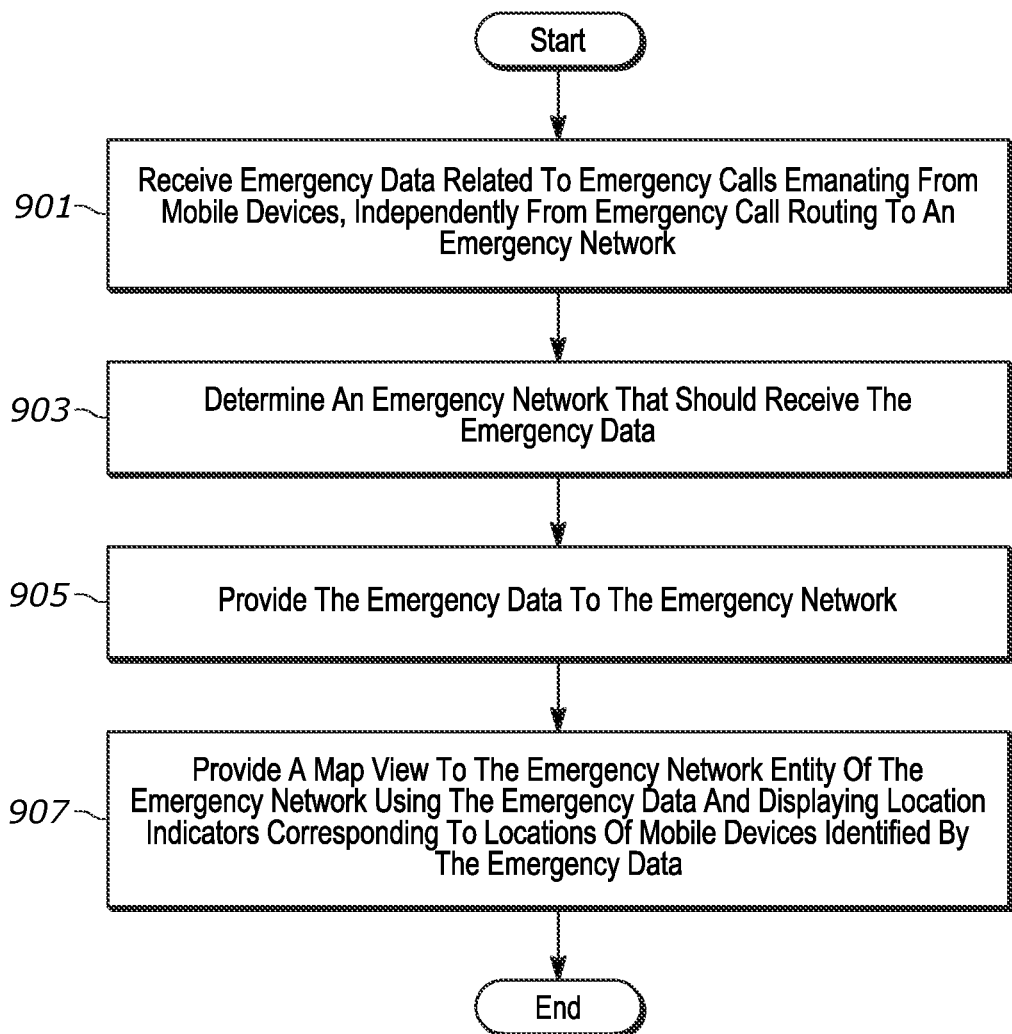
FIG. 9 is a flow chart of a method of operation in accordance with various embodiments.

FIG. 9 is a flowchart illustrating a method of operation in accordance with various embodiments. The method of operation begins, and in operation block 901, the emergency data manager 100 receives emergency data related to emergency calls emanating from mobile devices, independently from emergency call routing to an emergency network. Both the LIS 130 and the ADR server 140 may receive emergency data. In operation block 903, the emergency data manager 100 determines an emergency network that should receive the emergency data. This may be accomplished in several ways. In one way, the emergency data manager 100 compares received location information to determine if the location with within a geofence stored in geofence database 101. If yes, then the emergency data manager 100 sends the emergency data to the emergency network (which may be a PSAP) associated with the specific geofence. In another way, if there is no geofence in the geofence database 101 for the location, the emergency data manager 100 may access a web-based resource such as a NENA PSAP Database Tool, for example the Enhanced Public Safety Answering Point (PSAP) Registry and Census (EPRC), to determine an emergency network responsible for emergencies at the specific location. In yet another way, the emergency data manager 100 may access an emergency call data feed 172 to determine whether a device identifier in the emergency call data feed 172 matches a device identifier in the emergency data of the LIS 130 or ADR server 140 which indicates that the emergency call was routed to the emergency network and that therefore, the emergency network can receive the associated emergency data from the emergency data manager 100. In operation block 905, the emergency data manager 100 provides the emergency data to the emergency network. In operation block 907, the emergency data manager 100 provides a map view to the emergency network entity, such as a call-handling workstation, a CAD workstation, a combined call-handling and CAD workstation, etc., of the emergency network using the emergency data and displaying location indicators corresponding to locations of mobile devices identified by the emergency data.

Figure 10:
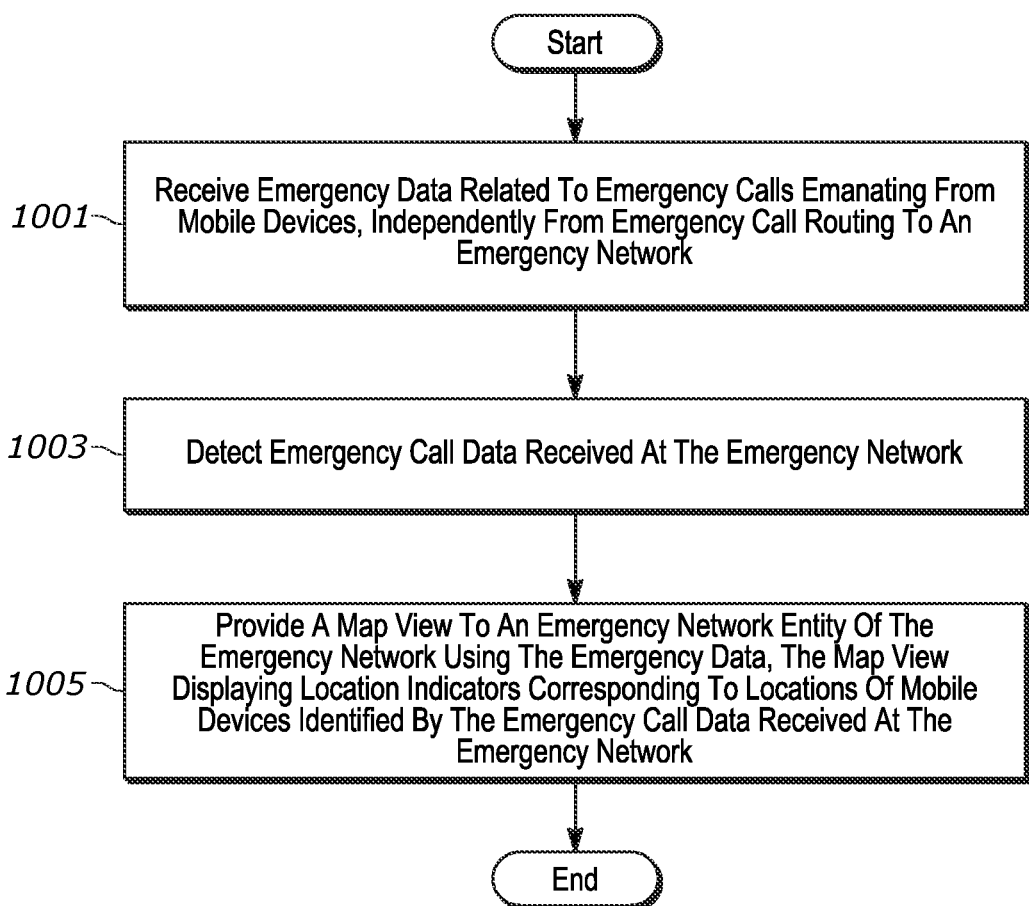
FIG. 10 is a flow chart of a method of operation in accordance with various embodiments.

FIG. 10 is a flowchart illustrating another method of operation in accordance with various embodiments. The method of FIG. 10 enables detailed customization of a map view displayed on an emergency network entity display, by determining which calls are being handled at the specific workstation and also by determining which calls have already been received, via emergency call routing completion, at the emergency network versus emergency calls that have emanated from mobile devices but that emergency call routing and/or call answering has not yet occurred. The method of operation begins, and in operation block 1001, the emergency data manager 100 receives emergency data related to emergency calls emanating from mobile devices, independently from emergency call routing to an emergency network.

In operation block 1003, the emergency data manager 100 detects emergency call data received at the emergency network. This is accomplished by monitoring of the emergency call data feed 172 that is received by a CPE of the emergency network. In legacy systems the emergency call data feed 172 is an ANI/ALI feed. In E911 and NG911 systems, the emergency call data feed 172 may be an XML ALI feed, a SIP header feed, an HTTP feed or some other type of feed that is IP-based and that may, or may not, use out-of-band signaling on trunk calls such as CAMA trunks, but that receives the emergency call data as IP-based data. The emergency call data feed 172 may be monitored and accessed by software executing on a network entity of the specific emergency network where the network entity software communicates with the emergency data manager 100 to send emergency call data feed 172 data. In other implementations, emergency response logic, which may be a hardware device, or a combination of hardware and software/firmware etc., is operative to intercept or monitor the emergency call data feed 172 at the emergency network and to send information to the emergency data manager 100 by IP-bases communication between the emergency response logic and the emergency data manager 100.

In operation block 1005, the emergency data manager 100 provides a map view to an emergency network entity of the emergency network using the emergency data, that displays location indicators corresponding to locations of mobile devices identified by the emergency call data received at the emergency network. In this example, the map view may be customized to distinguish between emergency calls places by mobile devices but not yet received by the emergency network, and emergency calls that have been routed or routed and answered by a call taker at the emergency network. A call queue may have different style entries to distinguish there and may use font color, font size, font style, entry highlighting, color markers, blinking/flashing, or any other visually appearing differentiator that may be displayed, etc. In other implementations a first emergency call queue may show emergency calls that have already arrived at the emergency network and a second emergency call queue may show emergency calls that have been placed by mobile devices that have not yet completed call routing or that have not yet been answered at the emergency network. A call "not answered" means that a telephone line at the emergency network is ringing but the call taker responsible for that emergency call has not yet answered it, but for example picking up a phone in a traditional system or otherwise pressing an answer call button on a software based phone system, etc.

Figure 11:
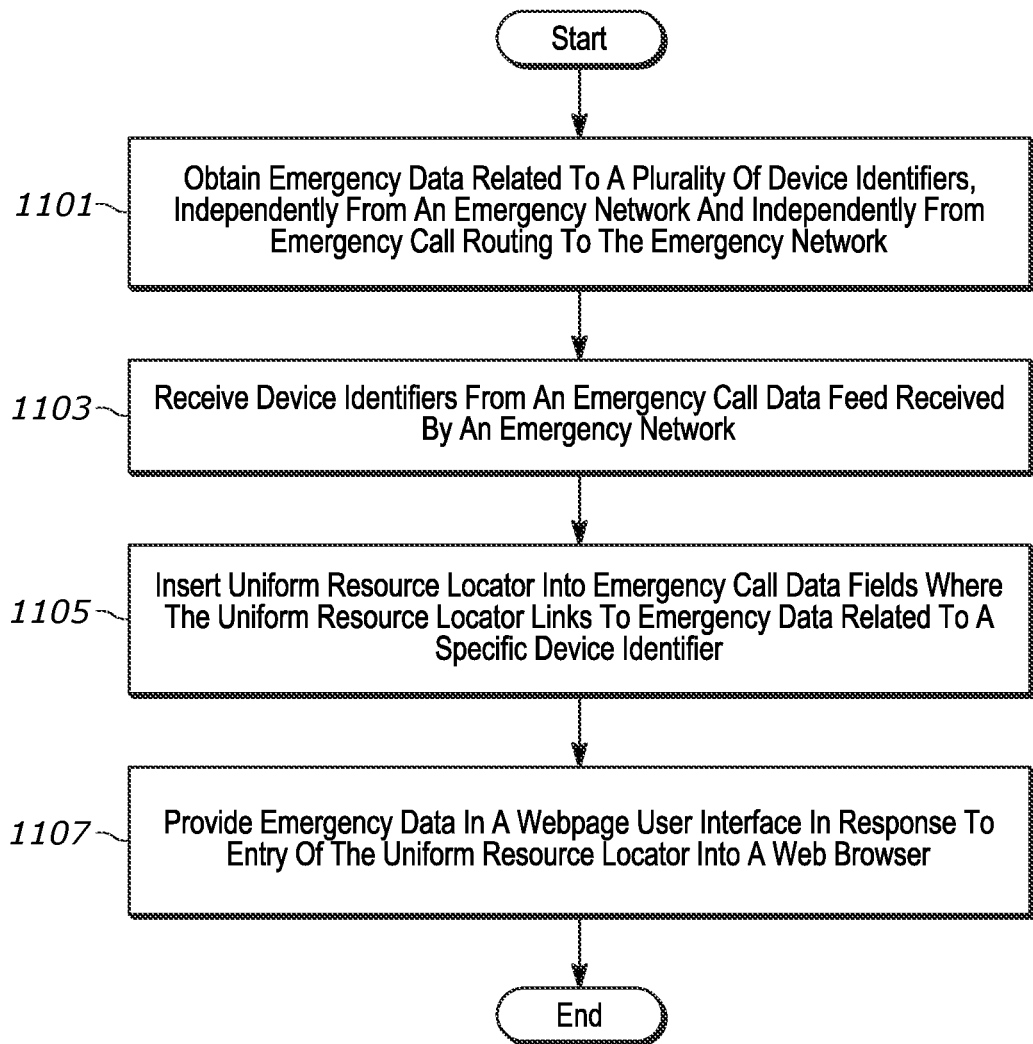
FIG. 11 is a flow chart of a method of operation in accordance with various embodiments.

FIG. 11 is a flow chart of a method of operation in accordance with various embodiments. The method of operation begins and in operation block 1101, the emergency data manager 100 obtains emergency data related to a plurality of device identifiers, independently from an emergency network and independently from emergency call routing to the emergency network. The emergency data is obtained by the emergency data manager 100 independently from the emergency network and independently from emergency call routing to the emergency network. In other words, the emergency data manager 100 is operative to receive emergency data from mobile devices 160 that place emergency calls via remote servers and Internet connectivity in which mobile devices 160 send emergency data directly from the mobile devices 160 to various Internet servers which also provide access to the data to the emergency data manager 100. These operations are independent from call routing from the mobile device 160 through various wireless networks 110 to the emergency network. In many cases the emergency data manager 100 will receive the emergency data prior to the emergency call being routed through the wireless network and/or PSTN network to the emergency network. Therefore, the emergency data manager 100 may have information about emergency calls prior to those calls being handled at the emergency network and at an emergency network call-handling workstation. In this example, the emergency data manager 100 provides a separate portal from CAD workstation software, and emergency call data arrives at the emergency network as part of call routing operations via the emergency call data feed 172, and is sent to the CAD workstations as a CAD spill. The emergency call data is displayed by the CAD software in related emergency call data feed data fields which, in legacy systems, may be or include ALI data.

In one implementation, the emergency call data feed 172 may be monitored on the emergency network by a software application running on an emergency network entity such as a call-handling workstation, a CAD workstation, a combined call-handling and CAD workstation, etc. In other implementations the emergency call data feed 172 may be monitored using emergency response logic in accordance with the examples shown in FIG. 6 and FIG. 7 with an example of the emergency response logic shown in FIG. 8.

In some implementations that use the emergency response logic, the emergency response logic may perform one or more operations depending on specific implementations. One operation of the emergency response logic is to obtain emergency call data from the emergency call data feed 172 or from the emergency network itself by, for example, obtaining the emergency call data from a CAD spill. Another operation of the emergency response logic is to query the emergency data manager 100 using the emergency call data. Yet another operation of the emergency response logic, in some implementations, is to aid in customization of emergency network entity map displays and emergency call queues by identifying and distinguishing on the map display and the emergency call queue, calls that have not yet been received or answered by the emergency network versus emergency calls that were placed, and for which the emergency data manager 100 was able to provide advance knowledge emergency data that can be displayed in the emergency call queue and on the map display. The emergency response logic may also send augmented data to the CAD software by appropriate APIs such that the CAD software can display the augmented data within the appropriate emergency call data field.

Thus, in operation block 1103 the emergency response logic receives device identifiers from the emergency call data feed 172 and checks with the emergency data manager 100 for emergency data available that is related to some or all of the device identifiers. A URL is generated by either the emergency data manager 100 or the emergency response logic, and in operation block 1105 the URL is inserted by the emergency response logic into the emergency call data field that is provided to, and displayed by, an emergency network entity software application such as, but not limited to, a call-handling software application or a CAD software application. The emergency network entity software application displays the URL within the data field in which it would normally display such data. For example, in legacy systems in which a CAD software application would display ANI/ALI data, the emergency response logic injects the URL into the data on the emergency network and the CAD software application displays the URL within its ANI/ALI data field as it would normally display ANI/ALI data. The operator may click on the URL, or enter it into a web browser to access emergency data available from the emergency data manager 100. Thus, in operation block 1107, when the operation clicks the URL or enters it into a web browser, a web page user interface is provided in response that provides the emergency data from the emergency data manager 100.

The URL approach is particularly helpful in legacy 911 systems in which CAD software applications expect ALI data which is limited to a given number of characters. The emergency response logic may receive device identifiers from the ALI data received by the emergency network as discussed above. For example, the emergency call data feed 172 to an emergency network may be monitored, or CAD spill data transmitted from emergency call-handling workstations to CAD workstations may be monitored by the emergency response logic which receives the ALI data packets, extracts the device identifiers contained in the ALI data packets and sends a query to the emergency data manager using the device identifiers. In cases where the CAD software application permits insertion of active HTTP links, the URL will appear as an HTTP link in the ALI data field, and the CAD workstation operator may then select the HTTP link using the workstation mouse. Otherwise, the CAD workstation operator must cut and past the URL into a web browser.

Figure 12:
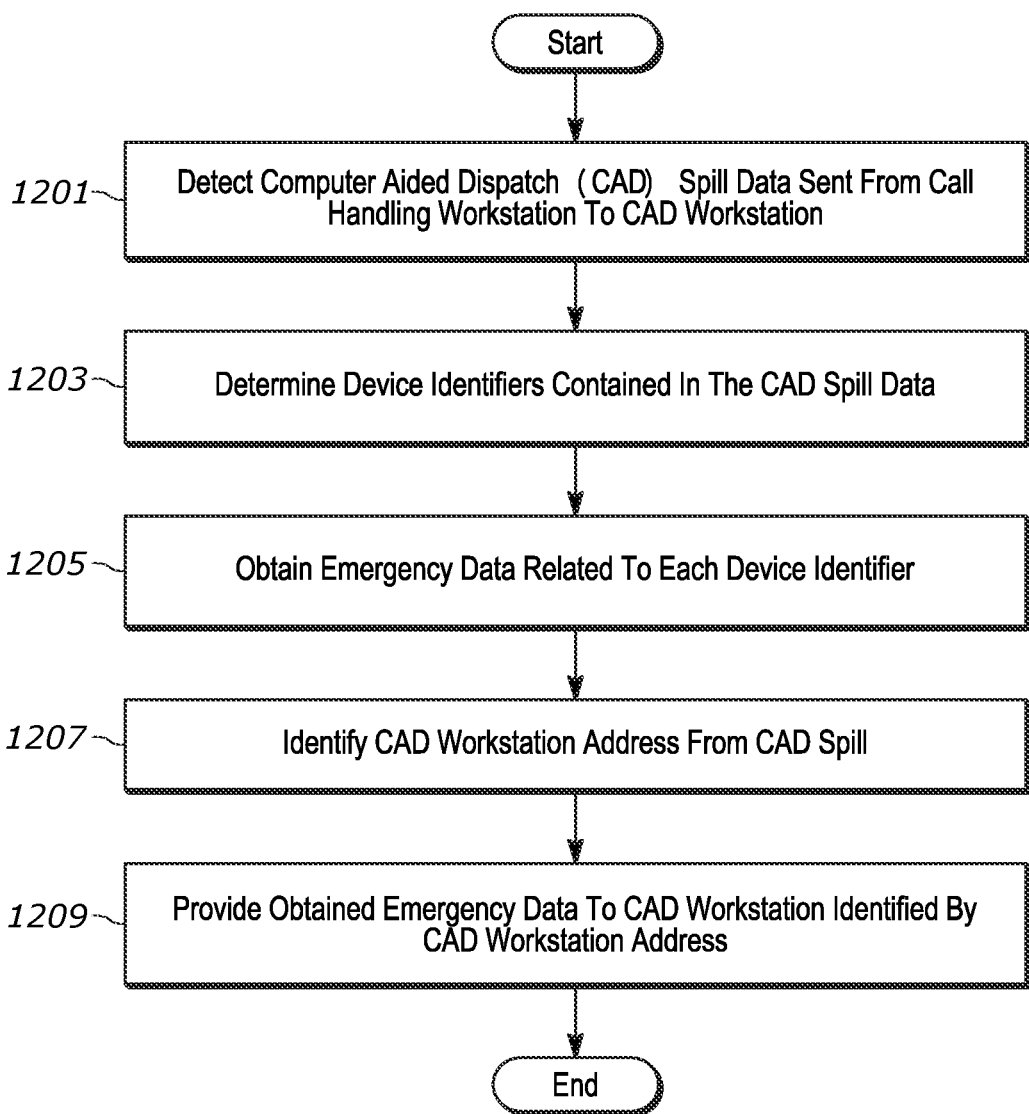
FIG. 12 is a flow chart of a method of operation in accordance with various embodiments.

FIG. 12 is a flowchart illustrating another method of operation in accordance with various embodiments. The method of operation begins, and in operation block 1201, a CAD spill sent from call-handling workstation to the CAD workstation is detected. In operation block 1203, a device identifier from emergency call data contained in CAD spill is determined. In legacy systems the emergency call data may be include ANI/ALI data however in E911 and NG911 systems the emergency call data may be XML based data, HTTP data, SIP data or some other suitable data format. In some implementations, a device identifier is present in a SIP INVITE and is used to establish an emergency call, and the emergency network may use the SIP INVITE device identifier and send that information in the CAD spill.

In operation block 1205, emergency data related to device identifier is obtained. In operation block 1207, a CAD workstation address is identified from the CAD spill, and in operation block 1209 the obtained emergency data is provided to the identified CAD workstation. The method of operation then terminates as shown. This process may also be used to customize the CAD workstation's EDM portal GUI 211 as discussed above with respect to other examples.

Figure 13:
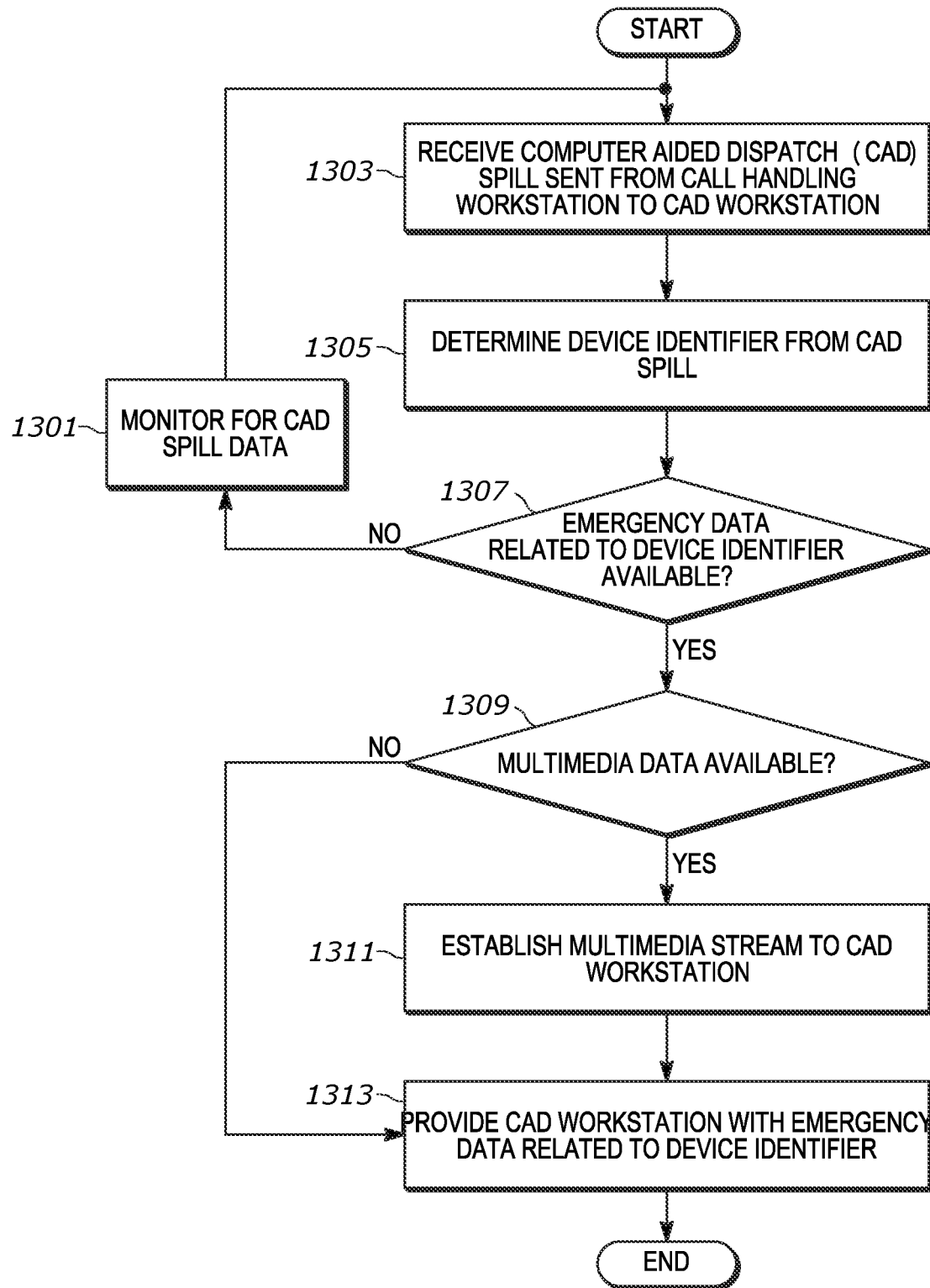
FIG. 13 is a flow chart of a method of operation in accordance with various embodiments.

FIG. 13 is a flowchart illustrating another method of operation in accordance with various embodiments. The method of operation begins, and in operation block 1303, a CAD spill sent from a call-handling workstation is received at a CAD workstation. In operation block 1305, at least one device identifier is determined from the CAD spill. In decision block 1307, the emergency data manager 100 determines whether any emergency data related to the device identifier is available. If not, then in operation block 1301, the process continues to monitor for CAD spill data. If in decision block 1307 it is determined that emergency data related to at least one device identifier is available, then the operation proceeds to decision block 1309. In decision block 1309, the emergency data manager 100 determines whether multimedia data is available related to the device identifier. For example, the emergency data manager 100 can access the geofence database 101 and look for cameras, sensors or other devices in a proximity to the location of a device 160 that initiated an emergency session. If data is available, then in operation block 1311, the emergency data manager 100 may establish a multimedia stream over an IP connection with the emergency response application 210 executing on the particular CAD workstation 220 associated with the CAD spill. The multimedia stream may then be displayed on the GUI 211. The method of operation also continues to operation block 1313 and the CAD workstation is provided with other emergency data, such as location data, related to device identifier. The method of operation then terminates as shown.

However, if it is determined that no multimedia data is available in decision block 1309, then the method of operation proceeds to operation block 1313 and the CAD workstation is provided only with available non-multimedia emergency data related to device identifier. The method of operation then terminates as shown.

Figure 14:
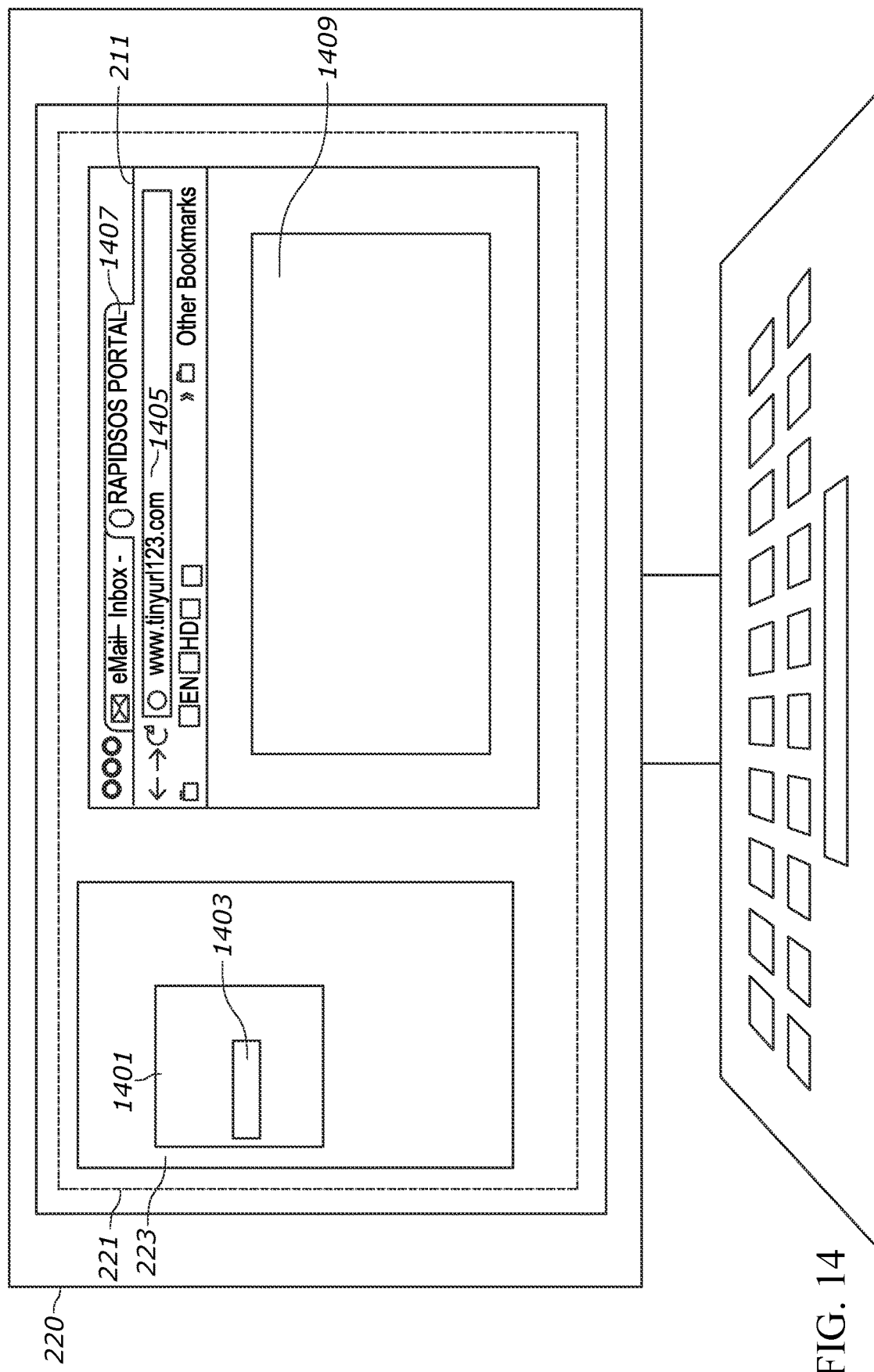
FIG. 14 is an example display screen of an emergency network entity in accordance with various embodiments.

FIG. 14 is an example display screen of an emergency network entity such as an emergency call-handling workstation 205, a CAD workstation 220, or some other emergency network workstation, in accordance with various embodiments. An emergency network entity software application such as, but not limited to, call-handling software, a CAD application, etc., provides the CAD software GUI 223 and is operative to display an emergency call data field 1401 that is populated with data from the emergency call data feed 201. The emergency data manager 100 and the emergency response logic are operative to insert a URL 1403 into the emergency call data feed 201 such that it is displayed within the emergency call data field 1401. The emergency network operator, such as, but not limited to, a CAD workstation 220 operator, may copy and paste, or type the URL into a web browser address field 1405 to open an EDM portal tab 1407 which is part of the EDM portal GUI 211. The EDM portal tab 1407 will display augmented emergency data 1409. The augmented emergency data 1409 may include a map view with location indicators that show the locations of mobile devices used to place emergency calls.

Figure 15:
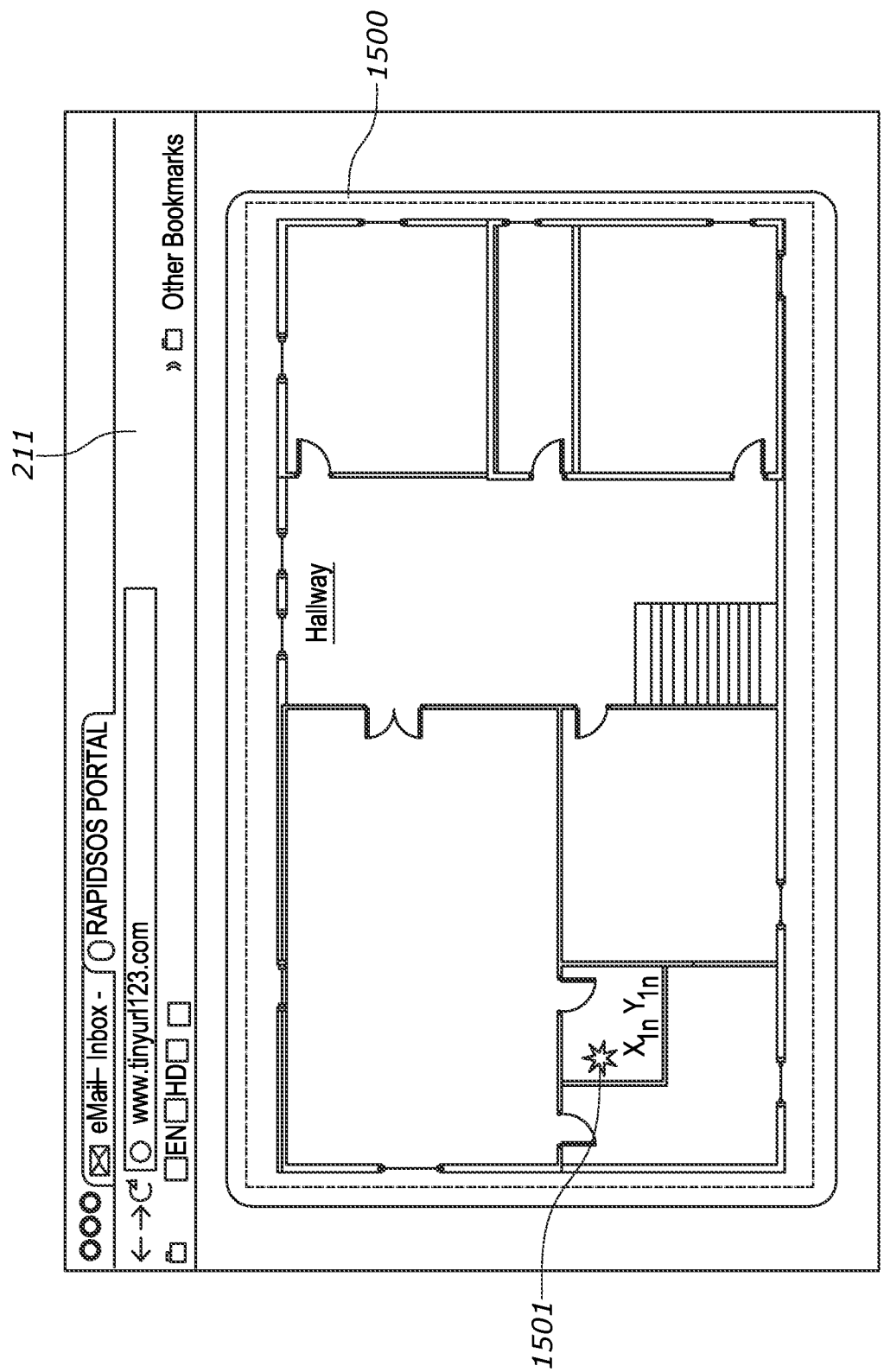
FIG. 15 is an example graphical user interface using a web browser in accordance with various embodiments.

FIG. 15 is an example graphical user interface using a web browser in accordance with various embodiments in which a building floor plan is provided. Within the EDM portal GUI 211, the URL in this example provides a building floor plan 1500 which also displays an emergency caller's location 1501 within the building. The URL with the floorplan may be sent by a CAD workstation 220 operator, or call handler, to emergency responders.

Figure 16:
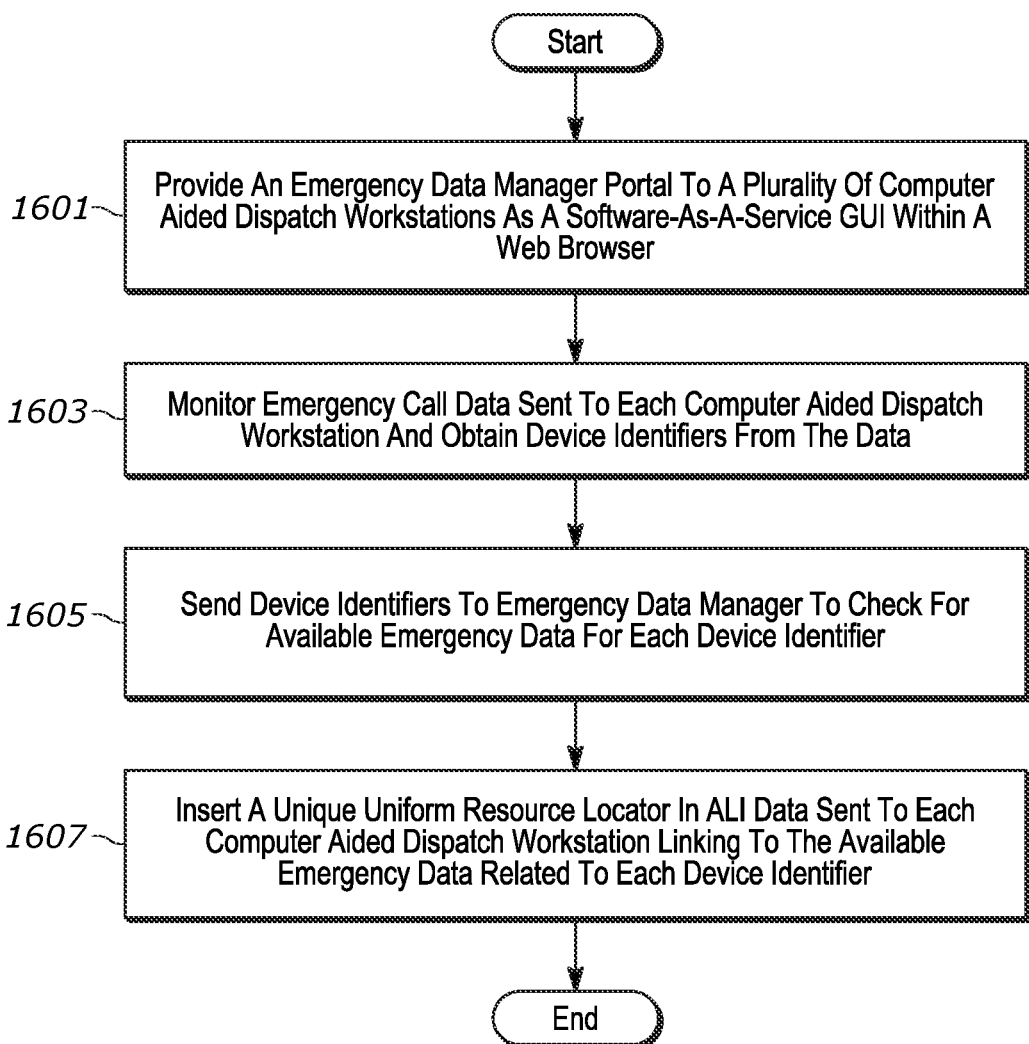
FIG. 16 is a flow chart of a method of operation in accordance with various embodiments.

FIG. 16 is a flow chart of a method of operation in accordance with various embodiments. The method of operation begins and in operation block 1601, the emergency data manager 100 provides an emergency data manager portal to the various CAD workstations of the emergency network as a software-as-a-service (SaaS) GUI within a web browser. In operation block 1603, the emergency response logic monitors the emergency call data sent to each CAD workstation and obtains device identifiers from the emergency call data. In operation block 1605, the device identifiers may be used to query the emergency data manager 100 to determine whether emergency data is available for each device identifier including providing emergency data updates such as, but not limited to, location updates. In operation block 1607, wherever emergency data is available related to a device identifier, the emergency response logic inserts a unique URL into augmented emergency call data sent to each CAD workstation where the URL links to the available emergency data provided by the emergency data manager 100 that is related to each device identifier.

Figure 17:
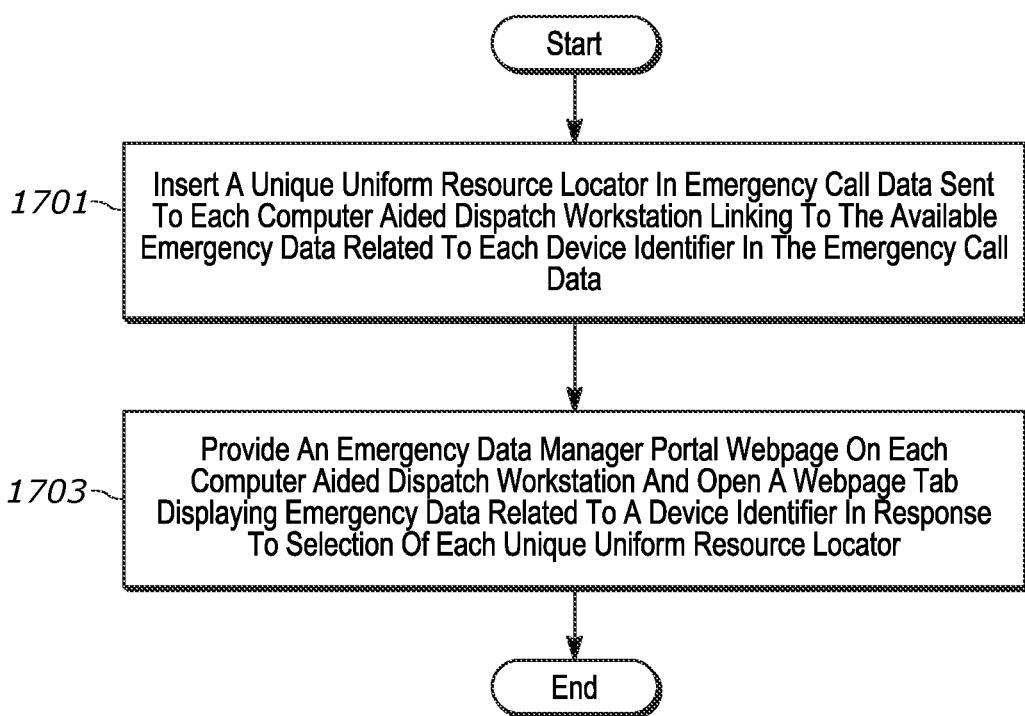
FIG. 17 is a flow chart of a method of operation in accordance with various embodiments.

FIG. 17 is a flow chart of a method of operation in accordance with various embodiments. The method of operation begins, and in operation block 1701, the emergency response logic inserts a unique URL into the emergency call data sent to each CAD workstation which links to available emergency data from the emergency data manager 100 that is related to each device identifier contained in the emergency call data. In operation block 1703, the emergency data manager 100 provides an emergency data manager portal webpage to each CAD workstation, and opens a webpage tab displaying emergency data related to a device identifier in response to selection of each unique URL by the CAD workstation operator. The method of operation then ends as shown.

The webpages presented to the CAD workstation operators may be a floorplan map, a video, photographs, or any other data related to an emergency call made by a mobile device. The emergency response logic operative at the emergency network may be implemented as hardware or as a software component. The webpages may also be displayed on an emergency call-handling workstation or on some other emergency network workstation instead of, or in addition to a CAD workstation.

FIG. 18 provides an example GUI 1801 that may be displayed on either a call-handling workstation or a CAD workstation. The GUI 1801 includes an emergency call data field 1803 which may display ALI data in legacy 911 systems or for emergency call routed via CAMA trunks that include only ALI data. The emergency response logic may insert a URL 1805 within the emergency call data field 1803 to provide a link to emergency data via the EDM portal GUI. Alternatively, or additionally, a device data field may include a URL field 1807 linking to the emergency data at the emergency data manager 100.

An example of emergency data sent by the emergency data manager 100 and displayed on the EDM portal GUI 211 is shown in FIG. 19. The emergency data may be provided by the LIS 130, the ADR server 140 or both. The emergency data displayed can include, but is not limited to: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. The EDM portal GUI 211 may display this additional information only on certain emergency network entities, such as workstations, that have been sent device identifiers from the emergency call data feed 172 that are associated with the displayed emergency data. An emergency network entity operator can access the page displaying the additional information by selecting a URL inserted into an emergency call data field by the emergency response application or the emergency response logic. The operator may also access the page directly via selection of a location indicator within the map view provided by the EDM portal GUI 211, or by selecting a link within a call queue displayed by the EDM portal GUI 211.

In the FIG. 19 example, the GUI 211 displays emergency data returned from the emergency data manager 100 within discrete categories of emergency data categories in separate data fields. For example, the GUI 211 may include a location field 1901, a demographics field 1907, a contact Information field 1909, an addresses field 1911, and a medical information field 1913. The "Demographics," "Contact Information," and "Addresses" groups of emergency data categories (as described above) are displayed sequentially under a "Personal Information" (as described above) section of the GUI. A Medical Information field 1913 is displayed below the Personal Information section. The GUI 211 may include one or more tabs to filter emergency data categories. For example, as depicted in FIG. 19, EDM portal GUI 211 can include a "Caller Information" tab 1903, and a menu 1905 including a "Location" tab, a "Caller-Provided Locations" tab, a "Devices" tab, and a "Directions" tab. A "Directions" tab can be selected within the EDM portal GUI 211 to render a map view displaying directions from an emergency network, such as a PSAP, to a location of an emergency situation. The map view is capable of providing real-time or near real-time traffic updates.

Figure 20:
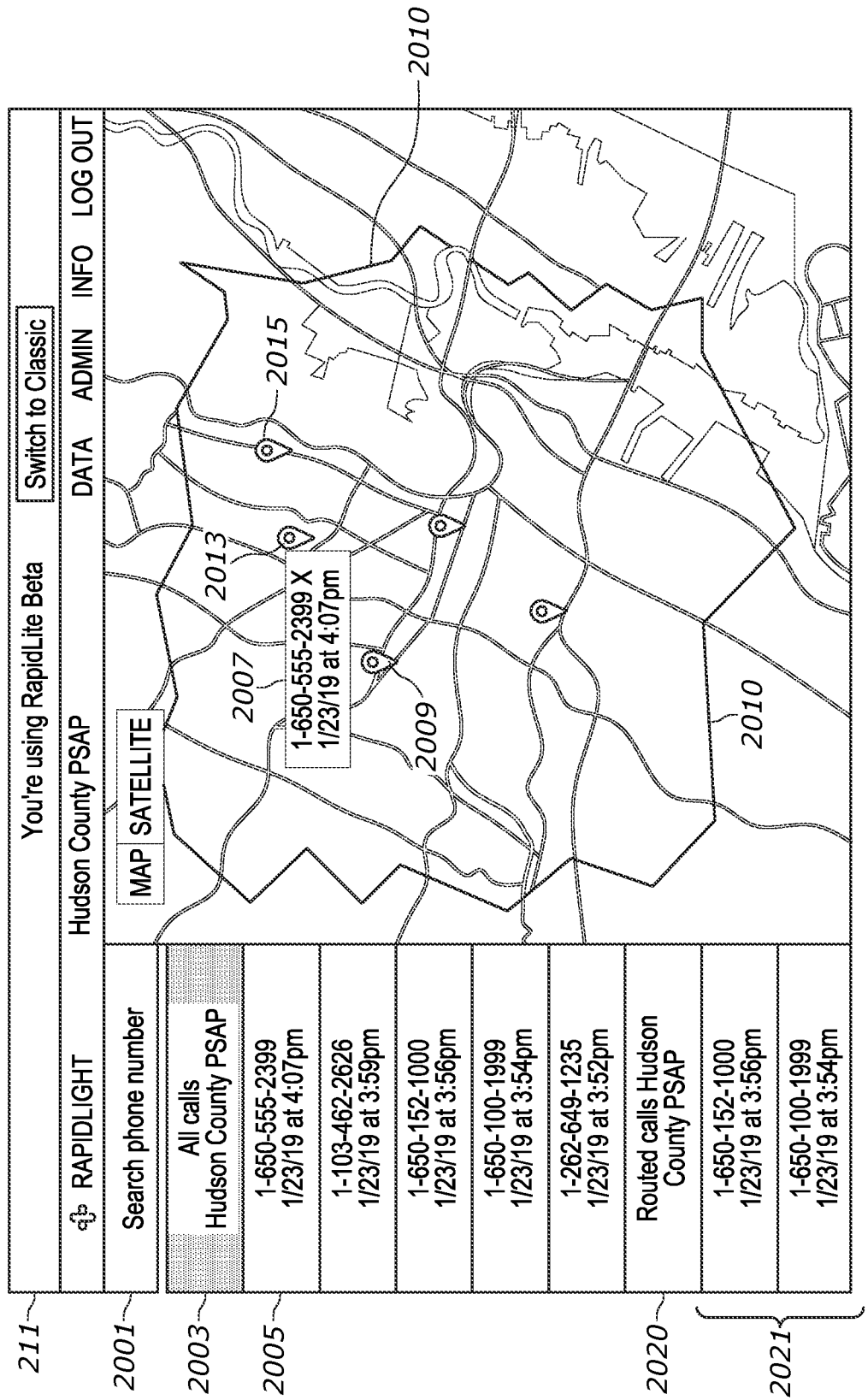
FIG. 20 is an example of an emergency response application graphical user interface provided by an emergency data manager.

FIG. 20 depicts a map view and emergency call queue provided and displayed by the EDM portal GUI 211. The page shown provides interactive elements that allow a user to generate an emergency data request using, for example, data entry field 2001 through which a user can submit a device identifier, such as by typing or pasting the device identifier into the entry field 2001. After submitting a device identifier through the entry field 2001, the user can prompt the emergency response application to generate and send an emergency data request by selecting a search button. In response to a user submitting a device identifier into the entry field 2001 and selecting the search button, the emergency response application generates an emergency data request including the device identifier and a temporary access token to the emergency data manager 100.

The map view and emergency call queue may be customized for the specific workstation on which it is displayed using the emergency call data feed 172 such that the call queue displayed on an emergency network entity display corresponds to the emergency call being handled at that workstation, i.e. at that specific emergency network entity. In the examples provided previously, the emergency network may be configured such that a CAD workstation only displays the emergency calls related to device identifiers it has received in an addressed CAD spill. In other configurations, each CAD workstation may display all emergency calls coming in to the emergency network, and the CAD workstation operator may select the specific emergency calls of interest, i.e. the ones that are being handled by the specific CAD workstation operator. Thus, for example, the first emergency call queue 2005 may show all emergency calls that have been placed for which the emergency data manager 100 has received emergency data, even though these emergency call have not yet been routed to the emergency network (i.e. the emergency network has not yet received the emergency call). The second emergency call queue 2020 may be configured to show emergency calls that have been received at the CPE of the emergency network. This is accomplished by the emergency response logic, or an emergency response application executing on a network entity, detecting device identifiers in the emergency call data feed 172 to the emergency network and comparing the list of identifiers with emergency data already received by the emergency data manager 100. Alternatively, the second emergency call queue 2020 may be configured to show only those emergency calls that the specific emergency network entity, such as a call-handling workstation or CAD workstation or combined call-handling and CAD workstation have answered or have been assigned via a CAD spill. In that case, the emergency call entries 2021 would pertain only to the specific workstation at which the operator is handling those calls.

The emergency data manager 100 receives emergency data from emergency call as they are placed by mobile device users, i.e. as the emergency calls emanate from the specific mobile devices and the emergency data includes, but is not limited to, mobile device location and associated device identifier. The emergency data manager 100 may also respond to specific queries for emergency data by searching/querying for a specific device identifier using data field 2001. After receiving an emergency data query including a device identifier, the emergency data manager 100 retrieves or gathers emergency data associated with the device identifier from one or more databases which may include one or more locations, and a current location. Location indicators are provided on the EDM portal GUI 211 to show the various locations. For example, the current location indicator 2015 shows the current location of the caller, and historic location indicator 2009 and historic location indicator 2013 show past locations as the caller has traveled. By moving the cursor over a historic location indicator 2009, emergency data 2007 is displayed in an overlay showing time, date, and the phone number (i.e. device identifier) of the caller's device. The call queue 2005 is also displayed and the operator may select any call from the call queue 2005 to display further information. The field 2003 shows that calls in the call queue 2005 are for a specific jurisdictional boundary 2010 which corresponds to a geofence and which is also displayed on the EDM portal GUI 211 which corresponds to the emergency network's emergency service zone. However, some implementations may not include the geofence information and in those implementations, a jurisdictional boundary line may not be displayed on the map view. The emergency data 2007 textual description of a current or historical location may include an indoor location, an amount of time elapsed since the current or historical location was received, and an amount of time elapsed since the current or historical location was generated.

Figure 21:
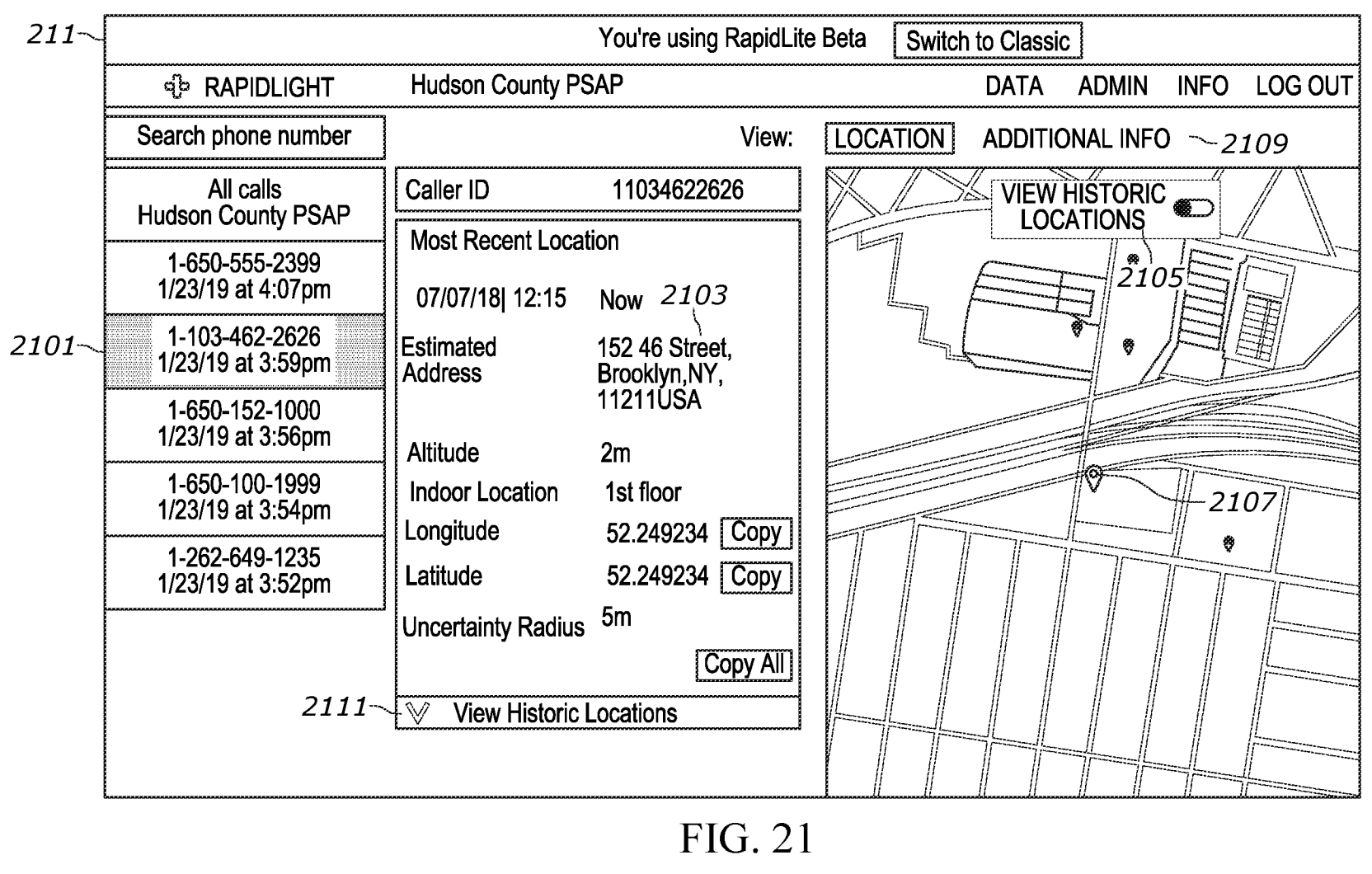

FIG. 21 illustrates an EDM portal GUI 211 view after selection of a device identifier 2101 in the call queue to enter the single caller view. The single caller view enlarges or moves the user's map view to detail the environment around the selected single caller location 2107. In the FIG. 21 example, call 2101 has been selected, resulting in the single caller view that shows the single caller location 2107. Enhanced location data 2103 and additional data 2109 may be available in the single caller view. The single caller view enables the viewing of past location data through the use of a historic locations toggle button 2105 or historic locations menu 2111. FIG. 21 also illustrates the use of a past location data feature. Toggling the historic locations button 2105 allows the user to view the past locations, of a particular device identifier in the call queue. Date and time may be displayed when the user selects or moves a cursor over a past location indicator. Past location indicators and the current location indicators may be displayed. Past location indicators are automatically denoted or visibly distinct from current location indicators. For example, past location indicators may be denoted as shades of color, wherein more distant location indicators may be lighter shades, while the current location indicator may be the darkest shade of the color, or a different color.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
    receiving emergency data related to emergency calls emanating from mobile devices, independently from emergency call routing to an emergency network;
    detecting emergency call data received at the emergency network;
    determining a portion of the emergency data corresponding to a group of emergency calls from mobile devices located in a service zone of the emergency network;
    sending the portion of the emergency data to the emergency network prior to detecting the emergency call data received at the emergency network for the group of emergency calls; and
    providing a map view to an emergency network entity of the emergency network using the emergency data, the map view displaying location indicators corresponding to locations of mobile devices identified by the emergency call data received at the emergency network.

2. The method of claim 1, further comprising:
    determining emergency calls placed to the emergency network that have not yet been received by the emergency network by performing a comparison of emergency call data received at the emergency network with the emergency data; and
    providing an emergency call queue on a display of the emergency network entity using the comparison to visually distinguish emergency calls placed to the emergency network from emergency calls received by the emergency network.

3. The method of claim 1, wherein determining a portion of the emergency data corresponding to a group of emergency calls from mobile devices located in the emergency network's service zone, comprises:
    determining that the location of each mobile device that placed an emergency call in the group of emergency calls is within the emergency network's service zone by checking a geofence database that defines the emergency network's service zone.

4. The method of claim 1, further comprising:
    detecting the emergency call data by obtaining session initiation protocol (SIP) headers at a SIP gateway.

5. The method of claim 1, further comprising:
    detecting the emergency call data by detecting an out-of-band signal on at least on trunked line to the emergency network.

6. The method of claim 5, further comprising:
    detecting the emergency call data in the out-of-band signal comprising automatic location identifier (ALI) data.

7. The method of claim 1, further comprising:
detecting emergency call data within computer aided dispatch (CAD) spill data sent to a dispatch workstation of the emergency network from an emergency call handling workstation of the emergency network.

8. The method of claim 7, further comprising:
obtaining a dispatch workstation address from the CAD spill data; and
providing the emergency data displayed on a display of a dispatch workstation identified by the CAD workstation address, where the dispatch workstation is the emergency network entity.

9. The method of claim 1, further comprising:
determining an emergency type based on the emergency data;
determining that additional emergency data is available based on the emergency type; and
providing the additional emergency data to the emergency network entity.

10. The method of claim 1, further comprising:
determining that multimedia data is available from a source in proximity to a mobile device location;
establishing a multimedia streaming connection with the emergency network entity; and
providing multimedia data to the emergency network entity over the multimedia streaming connection.

11. An apparatus comprising:
a network component, operative to support an Internet Protocol (IP) connection with a plurality of emergency network entities of an emergency network, and a remote emergency data manager; and
a processor, operatively coupled to the network component, the processor operative to:
receive emergency data related to emergency calls emanating from mobile devices, independently from emergency call routing to the emergency network;
detect emergency call data received at the emergency network;
determine a portion of the emergency data corresponding to a group of emergency calls from mobile devices located in a service zone of the emergency network;
send the portion of the emergency data to the emergency network prior to detecting the emergency call data received at the emergency network for the group of emergency calls; and
provide a map view to an emergency network entity of the emergency network using the emergency data, the map view displaying location indicators corresponding to locations of mobile devices identified by the emergency call data received at the emergency network.

12. The apparatus of claim 11, wherein the processor is further operative to:
determining emergency calls placed to the emergency network that have not yet been received by the emergency network by performing a comparison of emergency call data received at the emergency network with the emergency data; and
providing an emergency call queue on a display of the emergency network entity using the comparison to visually distinguish emergency calls placed to the emergency network from emergency calls received by the emergency network.

13. The apparatus of claim 11, wherein the processor is further operative to determine a portion of the emergency data corresponding to a group of emergency calls from mobile devices located in the service zone of the emergency network, by:
determining that the location of each mobile device that placed an emergency call in the group of emergency calls is within the emergency network's service zone by checking a geofence database that defines the emergency network's service zone.

14. The apparatus of claim 11, wherein the processor is further operative to:
detect the emergency call data by obtaining session initiation protocol (SIP) headers at a SIP gateway.

15. The apparatus of claim 11, wherein the processor is further operative to:
detect the emergency call data by detecting an out-of-band signal on at least on trunked line to the emergency network.

16. The apparatus of claim 15, wherein the processor is further operative to:
detect the emergency call data in the out-of-band signal comprising automatic location identifier (ALI) data.

17. The apparatus of claim 11, wherein the processor is further operative to:
detect emergency call data within computer aided dispatch (CAD) spill data sent to a dispatch workstation of the emergency network from an emergency call handling workstation of the emergency network.

18. The apparatus of claim 17, wherein the processor is further operative to:
obtain a dispatch workstation address from the CAD spill data; and
provide the emergency data displayed on a display of a dispatch workstation identified by the CAD workstation address, where the dispatch workstation is the emergency network entity.

19. The apparatus of claim 11, wherein the processor is further operative to:
determine an emergency type based on the emergency data;
determine that additional emergency data is available based on the emergency type; and
provide the additional emergency data to the emergency network entity.

20. The apparatus of claim 11, wherein the processor is further operative to:
determine that multimedia data is available from a source in proximity to a mobile device location;
establish a multimedia streaming connection with the emergency network entity; and
provide multimedia data to the emergency network entity over the multimedia streaming connection.

21. A system comprising:
emergency response logic comprising:
a network component, operative to establish an Internet connection to an emergency call handling workstation, a computer aided dispatch workstation (CAD) and a remote emergency data manager; and
a processor, operatively coupled to the network component, the processor operative to:
detect computer aided dispatch (CAD) spill data sent to a CAD workstation from an emergency call handling workstation, the CAD spill data comprising at least one device identifier associated with an emergency call;
send a query to the remote emergency data manager for location data using the at least one device identifier contained in the CAD spill data;

receive location data in response to the query; and
provide the location data to the CAD workstation on a map view within a browser window having an Internet protocol session with the remote emergency data manager.

22. The system of claim 21, wherein the processor is further operative to:
detect a CAD workstation address in the CAD spill data; and
provide the location data to the CAD workstation using the CAD workstation address.

23. The system of claim 21, wherein the remote emergency data manager is operative to:
provide a graphical user interface to a plurality of CAD workstations via a web browser executing on each CAD workstation.

24. The system of claim 23, wherein the remote emergency data manager is operative to:
provide a unique map view to each CAD workstations based on CAD workstation addresses detected in the CAD spill data.

25. The system of claim 23, wherein the remote emergency data manager is operative to:
provide the graphical user interfaces as a software-as-a-service graphical user interface.

26. The system of claim 23, wherein the remote emergency data manager is operative to:
provide an emergency call queue, where the emergency call queue for each CAD workstation is unique and is populated based on CAD workstation addresses detected in the CAD spill data and the location data sent to the CAD workstations using the CAD workstation addresses.

27. The system of claim 23, wherein the remote emergency data manager is operative to:
provide an emergency call queue including emergency data obtained by the remote emergency data manager from mobile devices from which emergency calls have emanated.

28. The system of claim 26, wherein the remote emergency data manager is operative to:
provide the emergency call queue including selectable links to the emergency data.

\* \* \* \* \*